(12) United States Patent
Rochberger

(10) Patent No.: US 6,262,984 B1
(45) Date of Patent: Jul. 17, 2001

(54) METHOD OF PREVENTING OVERLAPPING BRANCHES IN POINT TO MULTIPOINT CALLS IN PNNI NETWORKS

(75) Inventor: Haim Rochberger, Netanya (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/076,687

(22) Filed: May 12, 1998

(51) Int. Cl.[7] ............................. H04L 12/28; H04L 12/56

(52) U.S. Cl. ............................................ 370/395; 370/400

(58) Field of Search ..................... 370/395, 396, 370/397, 400, 410, 254, 351, 355, 356, 230, 231, 256, 408, 432

(56) References Cited

U.S. PATENT DOCUMENTS

| | | | |
|---|---|---|---|
| 5,291,477 | 3/1994 | Liew | 370/54 |
| 5,361,256 | 11/1994 | Doeringer et al. | 370/60 |
| 5,420,862 | 5/1995 | Perlman | 370/85.13 |
| 5,455,865 | 10/1995 | Perlman | 380/49 |
| 5,483,536 | 1/1996 | Gunji et al. | 370/85.14 |
| 5,491,690 | 2/1996 | Alfonsi et al. | 370/60 |
| 5,495,479 | 2/1996 | Galaand et al. | 370/60 |
| 5,544,327 | 8/1996 | Dan et al. | 395/250 |
| 5,550,818 | 8/1996 | Brackett et al. | 370/60 |
| 5,566,014 | 10/1996 | Glance | 359/124 |
| 5,590,118 | 12/1996 | Nederlof | 370/218 |
| 5,600,638 | 2/1997 | Bertin et al. | 370/351 |
| 5,603,029 | 2/1997 | Aman et al. | 395/675 |
| 5,629,930 | 5/1997 | Beshai et al. | 370/396 |
| 5,649,108 | 7/1997 | Spiegel et al. | 395/200.12 |
| 5,673,263 | 9/1997 | Basso et al. | 370/396 |
| 6,067,093 * | 5/2000 | Grau et al. | 345/440 |
| 6,088,333 * | 7/2000 | Yang e tal. | 370/238 |
| 6,111,881 * | 8/2000 | Soncodi | 370/395 |

OTHER PUBLICATIONS

Perlman, R., "Interconnections: Bridges and Routers", Addison–Wesley Publishing, Section 9.2.4, Chapter 9, pp. 205–264 (1992).

Sedgewick, R., "Algorithms", Second Edition, Addison–Wesley Publishing, Chapter 17, pp. 245–257 (1988).

Doeringer, W. et al., "Routing on Longest–Matching Prefixes", *IEEE/ACM Transactions on Networking*, vol. 4, No. 1, Feb. 1996, pp. 86–97.

Williams, K. A., "A Distributed ATM Network Based on an Optical Passive Star", printed from website http://williams.cs.ncat.edu/ATMStar.htm, 2 pages, (1998).

"All–optical ATM–Switch based on Self Electro–optic Effect Devices (SEED's)", printed from website http://www.stw.nl/projecten/T/tel3997.html, 2 pages, Feb. 2, 1997.

\* cited by examiner

Primary Examiner—Alpus H. Hsu
Assistant Examiner—Brian Nguyen
(74) Attorney, Agent, or Firm—Howard Zaretsky; McDonnell Boehnen Hulbert & Berghoff

(57) ABSTRACT

A method that provides a solution to the problem of overlapping branches in a point to multipoint call. The method is suitable for both Leaf Initiated Joins (LIJ) and existing point to multipoint call. The method has applications when adding a new leaf to an already existing point to multipoint connection and where the ROOT node has a corrupted point to multipoint view of the network. The method includes the overlapping node realizing that it is an overlapping node whereby it continues with the establishment of the downstream path in a conventional manner. The overlapping node then waits for the SETUP/ADD PARTY CONNECT to be received before continuing. Once the CONNECT is received, the overlapping node establishes an end point reference path to the point to multipoint root node over existing branches. The new call segments are established and the overlapping segments are then trimmed from the tree.

9 Claims, 15 Drawing Sheets

METHOD OF PREVENTING OVERLAPPING BRANCHES IN POINT TO MULTIPOINT CALLS IN PNNI NETWORKS

FIELD OF THE INVENTION

The present invention relates generally to data communication networks and more particularly relates to a method of preventing overlapping branches in point to multipoint calls within PNNI ATM networks.

BACKGROUND OF THE INVENTION

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

Asynchronous Transfer Mode

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

More information on ATM networks can be found in the book "ATM: The New Paradigm for Internet, Intranet and Residential Broadband Services and Applications," Timothy Kwok, Prentice Hall, 1998.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

The current standard solution for routing in a private ATM network is described in Private Network Node Interface (PNNI) Phase 0 and Phase 1 specifications published by ATM Forum. The previous Phase 0 draft specification is referred to as Interim Inter-Switch Signaling Protocol (IISP). The goal of the PNNI specifications is to provide customers of ATM network equipment some level of multi-vendor interoperability.

PNNI Phase 1

As part of the ongoing enhancement to the ATM standard by work within the ATM Forum and other groups, the Private Network to Network Interface (PNNI) protocol Phase 1 has been developed for use between private ATM switches and between groups of private ATM switches. The PNNI specification includes two categories of protocols. The first protocol is defined for the distribution of topology information between switches and clusters of switches where the information is used to compute routing paths within the network. The main feature of the PNNI hierarchy mechanism is its ability to automatically configure itself within the networks in which the address structure reflects the topology. The PNNI topology and routing techniques are based on the well known link state routing technique.

The second protocol is effective for signaling, i.e., the message flows used to establish point-to-point and point-to-multipoint connections across the ATM network. This protocol is based on the ATM Forum User to Network Interface (UNI) signaling with mechanisms added to support source routing, crankback and alternate routing of source SETUP requests in the case of bad connections.

With reference to the PNNI Phase 1 specifications, the PNNI hierarchy begins at the lowest level where the lowest level nodes are organized into peer groups. A logical node in the context of the lowest hierarchy level is the lowest level node. A logical node is typically denoted as simply a node. A peer group is a collection of logical nodes wherein each node within the group exchanges information with the other members of the group such that all members maintain an identical view of the group. When a logical node becomes operational, the nodes attached to it initiate and exchange information via a well known Virtual Channel Connection (VCC) used as a PNNI Routing Control Channel (RCC).

A diagram illustrating an example ATM network having three interconnected peer groups is shown in FIG. 1. The network, generally referenced 10, comprises three peer groups 12, 30, 50 each consisting of a plurality of nodes. Peer group 12 comprises nodes K 16, A 18 and P 20. A source user #1 22 is connected to node K. Peer group 30 comprises nodes L 36, M 38, Q 34 and N 40. A destination user #2 42 is connected to node N. Peer group 50 comprises nodes W 54, B 62, T 60, R 58 and S 56. Nodes P and B, M and S are connected physical link connections. Hello messages are sent periodically by each node on this link. In this fashion the Hello protocol makes the two neighboring nodes known to each other. Each node exchanges Hello packets with its immediate neighbors to determine its neighbor's local state information. The state information includes the identity and peer group membership of the node's immediate neighbors and a status of its links to its neighbors. Each node then bundles its state information in one or more PNNI Topology State Elements (PTSEs) which are subsequently flooded throughout the peer group.

PTSEs are the smallest collection of PNNI routing information that is flooded as a unit among all logical nodes within a peer group. A node topology database consists of a collection of all PTSEs received, which represent that particular node's present view of the PNNI routing topology. In particular, the topology database provides all the information required to compute a route from the given source node to any destination address reachable in or through that routing domain.

When neighboring nodes at either end of a logical length begin initializing through the exchange of Hellos, they may conclude that they are in the same peer group. If it is concluded that they are in the same peer group, they proceed to synchronize their topology databases. Database synchronization includes the exchange of information between neighboring nodes resulting in the two nodes having identical topology databases. A topology database includes detailed topology information about the peer group in which the logical node resides in addition to more abstract topology information representing the remainder of the PNNI routing domain.

During a topology database synchronization, the nodes in question first exchange PTSE header information, i.e., they advertise the presence of PTSEs in their respective topology databases. When a node receives PTSE header information that advertises a more recent PTSE version than the one that it has already or advertises a PTSE that it does not yet have, it requests the advertised PTSE and updates its topology database with the subsequently received PTSE. If the newly initialized node connects to a peer group then the ensuing database synchronization reduces to a one way topology database copy. A link is advertised by a PTSE transmission only after the database synchronization between the respective neighboring nodes has successfully completed. In this fashion, the link state parameters are distributed to all topology databases in the peer group.

Flooding is the mechanism used for advertising links whereby PTSEs are reliably propagated node by node throughout a peer group. Flooding ensures that all nodes in a peer group maintain identical topology databases. A short description of the flooding procedure follows. PTSEs are encapsulated within PNNI Topology State Packets (PTSPS) for transmission. When a PTSP is received its component PTSEs are examined. Each PTSE is acknowledged by encapsulating information from its PTSE header within the acknowledgment packet which is sent back to the sending neighbor. If the PTSE is new or of more recent origin then the node's current copy, the PTSE is installed in the topology database and flooded to all neighboring nodes except the one from which the PTSE was received. A PTSE sent to a neighbor is periodically retransmitted until acknowledged.

Note that flooding is an ongoing activity wherein each node issues PTSPs with PTSEs that contain updated information. The PTSEs contain the topology databases and are subject to aging and get removed after a predefined duration if they are not refreshed by a new incoming PTSE. Only the node that originally originated a particular PTSE can re-originate that PTSE. PTSEs are reissued both periodically and on an event driven basis.

As described previously, when a node first learns about the existence of a neighboring peer node which resides in the same peer group, it initiates the database exchange process in order to synchronize its topology database with that of its neighbor's. The database exchange process involves exchanging a sequence of database summary packets which contain the identifying information of all PTSEs in a node topology database. The database summary packet performs an exchange utilizing a lock step mechanism whereby one side sends a database summary packet and the other side responds with its own database summary packet, thus acknowledging the received packet.

When a node receives a database summary packet from its neighboring peer, it first examines its topology database for the presence of each PTSE described within the packet. If the particular PTSE is not found in its topology database or if the neighboring peer has a more recent version of the PTSE then the node requests the PTSE from the particular neighboring peer or optionally from another neighboring peer whose database summary indicates that it has the most recent version of the PTSE.

A corresponding neighboring peer data structure is maintained by the nodes located on either side of the link. The neighboring peer data structure includes information required to maintain database synchronization and flooding to neighboring peers.

It is assumed that both nodes on either side of the link begin in the Neighboring Peer Down state. This is the initial state of the neighboring peer for this particular state machine. This state indicates that there are no active links through the neighboring peer. In this state, there are no adjacencies associated with the neighboring peer either. When the link reaches the point in the Hello protocol where both nodes are able to communicate with each other, the event AddPort is triggered in the corresponding neighboring peer state machine. Similarly when a link falls out of communication with both nodes the event DropPort is triggered in the corresponding neighboring peering state machine. The database exchange process commences with the event AddPort which is thus triggered but only after the first link between the two neighboring peers is up. When the DropPort event for the last link between the neighboring peers occurs, the neighboring peer state machine will internally generate the DropPort last event closing all state information for the neighboring peers to be cleared.

It is while in the Negotiating state that the first step is taken in creating an adjacency between two neighboring peer nodes. During this step it is decided which node is the master, which is the slave and it is also in this state that an initial Database Summary (DS) sequence number is decided upon. Once the negotiation has been completed, the Exchanging state is entered. In this state the node describes is topology database to the neighboring peer by sending database summary packets to it.

After the peer processes the database summary packets, the missing or updated PTSEs can then be requested. In the Exchanging state the database summary packets contain summaries of the topology state information contained in the node's database. In the case of logical group nodes, those portions of the topology database that where originated or received at the level of the logical group node or at higher levels are included in the database summary. The PTSP and PTSE header information of each such PTSE is listed is listed in one of the nodes database packets. PTSEs for which new instances are received after the exchanging status have been entered may not be included in any database summary packet since they will be handled by the normal flooding procedures.

The incoming data base summary packet on the receive side is associated with a neighboring peer via the interface over which it was received. Each database summary packet has a database summary sequence number that is implicitly acknowledged. For each PTSE listed, the node looks up the PTSE in its database to see whether it also has an instance of that particular PTSE. If it does not or if the database copy is less recent, then the node either re-originates the newer instance of the PTSE or flushes the PTSE from the routing domain after installing it in the topology database with a remaining lifetime set accordingly.

Alternatively, if the listed PTSE has expired, the PTSP and PTSE header contents in the PTSE summary are accepted as a newer or updated PTSE with empty contents. If the PTSE is not found in the node's topology database, the particular PTSE is put on the PTSE request list so it can be requested from a neighboring peer via one or more PTSE request packets.

If the PTSE request list from a node is empty, the database synchronization is considered complete and the node moves to the Full state.

However, if the PTSE request list is not empty then the Loading state is entered once the node's last database summary packet has been sent but the PTSE request list is not empty. At this point, the node now knows which PTSE needs to be requested. The PTSE request list contains a list of those PTSEs that need to be obtained in order to synchronize that particular node's topology database with the neighboring peer's topology database. To request these PTSEs, the node sends the PTSE request packet which contains one or more entries from the PTSE request list. The PTSE request list packets are only sent during the Exchanging state and the Loading state. The node can sent a PTSE request pack to a neighboring peer and optionally to any other neighboring peers that are also in either the Exchanging state or the Loading state and whose database summary indicate that they have the missing PTSEs.

The received PTSE request packets specify a list of PTSEs that the neighboring peer wishes to receive. For each PTSE specified in the PTSE request packet, its instance is looked up in the node's topology database. The requested PTSEs are subsequently bundled into PTSPs and transmitted to the neighboring peer. Once the last PTSE and the PTSE request list has been received, the node moves from the Loading state to the Full state. Once the Full state has been reached, the node has received all PTSEs known to be available from its neighboring peer and links to the neighboring peer can now be advertised within PTSEs.

A major feature of the PNNI specification is the routing algorithm used to determine a path for a call from a source user to a destination user. The routing algorithm of PNNI is a type of link state routing algorithm whereby each node is responsible for meeting its neighbors and learning their identities. Nodes learn about each other via the flooding of PTSEs described hereinabove. Each node computes routes to each destination user using the information received via the PTSEs to form a topology database representing a view of the network.

Using the Hello protocol and related FSM of PNNI, neighboring nodes learn about each other by transmitting a special Hello message over the link. This is done on a continual periodic basis. When a node generates a new PTSE, the PTSE is flooded to the other nodes within its peer group. This permits each node to maintain an up to date view of the network. Additional information on link state routing can be found in Section 9.2 of the book Interconnections: Bridges and Routers by Radia Perlman, Addison-Wesley, 1992, incorporated herein by reference.

Once the topology of the network is learned by all the nodes in the network, routes can be calculated from source to destination users. A routing algorithm that is commonly used to determine the optimum route from a source node to a destination node is the Dijkstra algorithm. The Dijkstra algorithm is used to generate the Designated Transit List which is the routing list used by each node in the path during the setup phase of the call.

With reference to FIG. 1, a peer group can be represented at higher hierarchical levels by a single node called a logical group node. The functionality of this node is executed by one of the actual physical nodes in the peer group which is termed the peer group leader (PGL). There can only be one active PGL in a peer group at any one time. The PGL functions to aggregate and distribute information to maintain the PNNI hierarchy. In other respects the node behaves like any other node. A peer group leader election (PGLE) process is used to determine which physical node will act as the PGL. The node's PGL leadership priority is used to determine which node will be the PGL. The node with the highest leadership priority acts as the leader of that peer group. The election process is continuously run, thus the PGL can change over time when another node in the peer group attains a higher leadership priority. When a PGL is removed or fails, the node with the nest highest leadership priority takes over as the PGL.

The logical group node for peer group 12 is represented by node D 14, node Z 32 for peer group 30 and node C 52 for peer group 50. In this example node A is the PGL for peer group 12, node M is the PGL for peer group 30 and node B is the PGL for peer group 50. The logical group node functions to aggregate and summarize information about its child peer group and flood this information to its own peer group. The logical group node passes information from its peer group to the PGL of its child peer group for flooding.

Each peer group has a peer group ID associated with it. The peer group ID is 14 bytes consisting of a 1 byte PNNI level indicator and a 13 byte prefix. The peer group ID of a parent peer group must be shorter in length than its child peer group IDs. The node elected to be the PGL is configured with its parent peer group ID. Note also that a node ID is 22 bytes consisting of a 1 byte PNNI level indication, 1 byte physical field (AO) and a 20 byte field which may be, for example the ATM node address. The node address is a 20 byte address that is unique among all the nodes. For example, it may consist of a 13 byte ATM prefix, 6 byte MAC address and a 1 byte selector field.

The PGL as a member of the peer group receives complete topology state information from all the nodes in the peer group. Thus, the PGL is provided with the required information to instantiate the logical group node, i.e., nodes D, Z, C. The PGL thus feeds information up to the logical group node it instantiates. The information includes reachability which refers to summarized address information needed to determine which addresses can be reached through the lower level peer group. The information also includes topology aggregation type information which refers to the summarized topology information needed to route into and across the peer group. Only the information needed by higher levels is actually propagated with PTSEs never flowing up the hierarchy. Rather, the summarized data is advertised within PTSEs originated by the logical group node and flooded to its peers.

Feeding information down the hierarchy is necessary to permit nodes in the lower levels peer groups to route to all destination reachable via the PNNI routing domain. Each logical group node needs information down to its underlying peer group. The information comprises all PTSEs that it originates or receives via flooding from other members of the logical group node's peer group. Each PTSE that flows down to a PGL is flooded across that peer group. Thus, every node in a peer group gets a view of the higher levels into which it is aggregated. PTSEs thus flow horizontally through a peer group and downward into and through child peer groups.

Neighboring nodes that conclude via the Hello protocol that they belong to different peer groups, they become border nodes. For example, nodes P, B, S and M are border nodes. Links between border nodes are termed outside links and there is no database exchange across outside links. Only the PNNI Hello protocol flow occurs on the outside link. Border nodes include in their Hello exchange information about their respective higher level peer groups along with the logical group nodes representing them in these peer groups. This permits the border nodes to determine the lowest level peer group common to both border nodes.

Thus, each node eventually gains knowledge of the complete topology of its peer group and of the higher level parent peer group. In order for node to realize which border nodes are connected to which higher level nodes, the border nodes advertise links to those higher level nodes which are termed uplinks. The node (termed an upnode) at the other end of the uplink is always a neighboring peer of one of its ancestor nodes.

In FIG. 1, border node B is connected to border node P via physical link 70. Likewise, border node S is connected to border node M via physical link 73. An SVC is established between the PGL of neighboring peer groups. Thus, for example, PGL node B (which is also a border node) and PGL node A establish an SVC 64 between them. In addition, uplinks are created between border nodes and upnodes in neighboring peer groups. For example: uplink 76 between border node B and upnode D; uplink 74 between border node P and upnode C; uplink 82 between border node S and upnode Z.

Note that neighboring PNNI nodes use a routing control channel (RCC) for the exchange of PNNI routing information. Neighboring nodes at the lowest level of the PNNI routing hierarchy use a reserved VCC for the RCC. The RCC is a Switched Virtual Channel Connection (SVCC). The information required to establish this SVCC is derived from the uplink advertisements in the peer group represented by the logical group node.

When the SVCC for the RCC is established, the nodes in both neighboring peer groups have the information needed to route the SVCC, i.e., each peer group has its own internal topology database information and has knowledge and identity of the uplinks and upnodes required for the routing of the SVCC based RCC.

Further, horizontal links are links formed between nodes in the same peer group. Thus, nodes W, B, R, T and S are connected by horizontal links. In addition, logical group nodes D and C are connected by horizontal link 78 and nodes C and Z are connected by horizontal link 80. Hellos are send over the horizontal links 78, 80 using the SVCC based RCCs to exchange port IDs and status just as if they were physical links. Note that horizontal links are not advertised until a successful exchange of Hellos and completion of database synchronization between neighboring nodes over the RCC. PTSEs describing the new link are then flooded within the peer group containing the link and downwards to the child peer groups. The horizontal link between two logical group nodes represents the connectivity between the two nodes for routing purposes. The logical group nodes assign port IDs to the horizontal links attached to the node.

A diagram illustrating the structure of an uplink PTSE is shown in FIG. 2. As an example, the uplink PTSE is shown for node P. The PTSE comprises several fields including but not limited to the node ID 92 which is set to 'P', the uplink 94 which is set to upnode C, the peer group ID 96 of the upnode (of peer group 12) which is set to 'haim' (note that the node ID of the logical group node is set to D), the upnode address 98 and other relevant data 100.

PNNI Phase 2

As part of the ongoing enhancement to the ATM standard by work within the ATM Forum and other groups, the Private Network to Network Interface (PNNI) protocol Phase 2 has been developed for use between private ATM switches and between groups of private ATM switches. The PNNI-2 specification is currently in draft form and includes support for point to multipoint calls. One capability is that the root of a point to multipoint connection can join leaves to the connection. In addition, leaves can join point to multipoint connection with or without intervention from the root. Leaf initiated join (LIJ) capability permits users (leaves) to request to be added to a point to multipoint connection. A leaf requests to be added to an LIJ connection by sending a LEAF SETUP REQUEST message to the network. In a root prompted join, a leaf generates and sends a request which is handled by the root.

The root adds leaves to and removes leaves from a new or established connection via point to multipoint procedures outlined in the ATM UNI Signaling Specification Version 4.

In general, point to multipoint connections are subject to the requirement that no two of its branches overlap under normal connections. The PNNI-2 specification does not have any signaling support to fix overlapping branches, thus placing the burden on the routing algorithms to prevent this.

Once a LIJ connection is established, any node along the connection may process a new LEAF SETUP REQUEST (LSR) message. A node needs to have a view of the connection, i.e., the links and nodes currently being used by the connection, in order to compute a route to the new leaf which satisfies the branch overlap restriction.

In a root LIJ, the leaf request is handled by the root. The root, in response, sends a SETUP message (for new connections), an ADD PARTY message (for established connections) or a LEAF SETUP FAILURE message to reject the request.

A node receiving a LEAF SETUP REQUEST message sent by a leaf over a UNI interface checks if the requested LIJ connection is present. If it is, the request is forwarded in the direction of the root. If it is not, the node computes a route to the root and inserts the corresponding DTLs into the request message. The node then forwards the message to the outgoing port specified by the lowest level DTL.

For PNNI interfaces, a node receiving a LEAF SETUP REQUEST message checks if the requested connection is active. If it is, the message is forwarded in the direction of the root after the DTLs are removed. If the connection is not active, the node computes a route to the root.

Each node traversed by an LIJ connection stores information about the connection so that DTLs are computed such that no two branches overlap. The information is used by a node to form what is termed a view of the point to multipoint connection. Nodes should select a path so that the reachable branches of the resulting connection form a tree. No two branches of a point to multipoint connection should have a link in common. Neither should they have a node in common except for the node at which they branch. An exception to this is when one of the branches cannot accept new parties at the time when the other branch is first specified. An example of a case where a branch cannot accept new parties is when the identity of a logical group node along the path changes due to a change in the underlying peer group leader. Thus, a node must maintain a view of the point to multipoint connection.

There may be cases, however, where, due to the instability of the network, branch overlapping occurs. In this case, a node along the point to multipoint branch may have more then one incoming port associated with the same call. Each instance of the point to multipoint connection is identified by a unique incoming interface/call reference combination, but they all belong to the same call.

Within peer group 12, node A is elected the PGL. Via the Hello protocol, node A sees four nodes: A, K, P and D. Node D is the logical group node created by the PGL. A portion of the topology database in node A contains the data presented in Table 1 below.

TABLE 1

| Level | Node ID | PGL Priority | Peer Group ID |
|-------|---------|--------------|---------------|
| 60    | D       | 5            | haim          |
| 70    | A       | 10           | david         |

Logical node D (node A physical) forwards a PTSE to the members of its peer group with information about itself as the parent node.

Within peer group 50, node B is elected the PGL. Via the Hello protocol, node B sees six nodes: B, W, R, S, T and C. Node C is the logical group node created by the PGL. A portion of the topology database in node B contains the data presented in Table 2 below.

TABLE 2

| Level | Node ID | PGL Priority | Peer Group ID |
|-------|---------|--------------|---------------|
| 60    | C       | 0            | haim          |
| 80    | B       | 15           | moshe         |

Logical node C (node B physical) forwards a PTSE to the members of its peer group with information about itself as the parent node.

After border nodes P and B are connected and run the Hello protocol their topology databases contain information sent from each other. Node P contains data shown in Table 3 below.

TABLE 3

| Level | Node ID | Peer Group ID | Node Address |
|-------|---------|---------------|--------------|
| 60    | D       | haim          | address #1   |
| 70    | P       | david         | address #2   |

Likewise, node B contains data shown in Table 4 below.

TABLE 4

| Level | Node ID | Peer Group ID | Node Address |
|-------|---------|---------------|--------------|
| 60    | C       | haim          | address #3   |
| 80    | B       | moshe         | address #4   |

Tables 1 though 4 presented above are portions of what is termed the Hierarchical Binding List (HBL). From the Hello protocol message transaction, nodes P and B determine that they have a mutual common level, since their parent peer group level (60) and peer group ID (haim) are identical. At this point, the other members of each peer group are not aware that they are all members of the same logical parent peer group.

The border nodes in each peer group generate the uplinks and associated PTSEs as described previously (nodes B to D and P to C). PTSEs containing information learned from the Hello message are flooded to peers within the peer group.

Nodes P and B thus learn about their respective uplinks 74, 76 associated with the physical link 70. Node A is among the nodes that receive the flooded PTSE about the uplink. Node A subsequently informs logical group node D about the uplink to C. Likewise, node B informs logical group node C about the uplink to D.

Node D then requests a link to node C and node C requests a link to node D, i.e., the horizontal link 78. It is decided that node D requests the SVC to node C. In reality, node A creates the SVC to node C. Similarly, node B creates an SVC to node D. Note that the node ID can be used to decide which node establishes the call. If two calls are established, one of them is dropped.

The two logical group nodes exchange Hello messages and synchronize their databases just as if they were physical nodes connected by a physical connection. Once the two nodes are in the full state, each creates a PTSE advertising the link created between them. Node C floods the PTSE to nodes D, B, R, W, S and T. Node D floods the PTSE to nodes C, A, K and P. Note that node P knows about the uplink to node C but not about the uplink between nodes D and B. In similar fashion, nodes Z and C exchange information and flood PTSEs to each other and their child nodes.

With reference to FIG. 1, the source user #1 requests a point to multipoint call be established to destination user #2. The SVC 72 is established through nodes K, P, B, R, S, M and N. The source user #1 is the originator of the data and node K is the root node. Since node K does not have knowledge of nodes B, R, S, T and W, the DTL stack created is as follows in Table 5.

TABLE 5

| DTL No. | Level | DTL Contents |
|---------|-------|--------------|
| 1       | 70    | (K,P)        |
| 2       | 60    | (D,C,Z)      |

When the DTL stack arrives at node P, it deletes DTL #1 and examines DTL #2. It realizes that it must route to node C but since B is the border node it realizes that node C is actually itself. After arrival as node C, a new DTL stack is created which is shown in Table 6.

TABLE 6

| DTL No. | Level | DTL Contents |
|---------|-------|--------------|
| 1       | 70    | (B,R,S)      |
| 2       | 60    | (D,C,Z)      |

In like fashion, this process continues across the link between border nodes S and M. When the setup request arrives at node S, it is forwarded to node M in peer group 30. The call is routed to node N which is the destination node and the call terminates with the destination user #2.

It is now assumed that a physical connection is made between nodes K and L as shown in FIG. 3. Via the Hello protocol, uplink 81 is established between nodes K and Z. Horizontal link 79 is also established between logical group nodes D and Z over physical link 77. It is noted that now the three peer groups are connected in triangular fashion. In addition, destination user #3 83 is added. The DTL stack generated by K to add the new user #3 to the point to multipoint call is shown below in Table 7.

TABLE 7

| DTL No. | Level | DTL Contents |
|---|---|---|
| 1 | 70 | (K,P) |
| 2 | 60 | (D,C,Z) |

Note that a direct path now exists straight from node D to node Z. Although both paths end up in the same place but over a different route, there will be a doubling of the number of cells transmitted from node K. In the PNNI standard, point to multipoint paths to various leaves branches travel over the same path as much as possible. Point to multipoint branches are not permitted to overlap as described above. If overlapping branches were permitted there would be numerous redundancies. Cells leaving node K would need to be duplicated which in the typical network is a waste of network resources and is not desirable.

The solution provided by the PNNI standard is that each node in the call maintain a view of the point to multipoint call. Thus, node K (the root node) has a point to multipoint view. Node K maintains a separate view for each level for each point to multipoint call. Node K will not route over a newly created link if a path already exists to node Z. The root node always uses an existing route that was created previously even if better routes are created by the addition of new links.

Notwithstanding the solution provided by the PNNI standard, a problem arises when one of the nodes that was the PGL is for some reason removed and brought back. This can be caused, for example, by a reboot of the node or other reset mechanism. In addition, this can be caused by another node attaining a higher priority which can occur due to numerous reasons, e.g., a network manager manual sets the priority to be higher.

If a new PGL is elected due to any reason, a new node ID is assigned to the new PGL. Although the PGL sits at the same position in the hierarchy as the previous PGL, a new node ID is assigned to it nevertheless. A major problem, however, exists since none of its child peers can relate the new PGL node ID with the old one. An example of this is shown in FIG. 4 wherein node B is rebooted for some reason and a new logical group node X 53 replaces node C. Node B could continue to be the PGL or another node could have been elected PGL. In either case, the logical group node X is assigned a new node ID. None of the child peers can relate nodes C and X.

Now, if an ADD PARTY message is requested for user #3, node K will choose a route that goes straight to node Z. Although node K knows about node X, the more direct path to Z over link 77 is chosen since it is less costly. This is despite the fact that node X took the place of node C. The current view of node K does not include node X since it is new, thus, to node K it is permissible to choose the new, less costly route. Now, a call path exists with an overlapping branch between nodes M and N and node M being the overlapping node. This is an inefficient use of network resources and is undesirable in the typical network.

In addition, the problem of overlapping branches is also likely to occur in ATM networks after electrical power outages that cause some network equipment to shutdown and subsequently reboot/recover since users typically do not wait for the network to stabilize.

Further, in big hierarchical PNNI networks, there may be more than one node in a peer group that are capable of acting as the PGL. This may be for redundancy reasons, for example. In this case, the PGL elected depends on the order that the nodes boot up. In order to give priority to bigger nodes, the network manager may give different PGL priorities to the nodes. Thus, it may occur that a node with a lower priority comes up first and establishes one or more point to multipoint calls before a node with a larger priority boots up.

Note also that due to the connection orientation of ATM, once a call is established it may exist for a very long time. Thus, routes that use overlapping branches results in networks having very poor network optimization.

SUMMARY OF THE INVENTION

The present invention is a method that provides a solution to the problem of overlapping branches described above. The method is suitable for both Leaf Initiated Joins (LIJ) and existing point to multipoint calls. Note that all the nodes up to the ROOT node must support the method of the present invention in order for the overlapping node feature of the invention to work. The method is particularly useful when adding a new leaf to an already existing point to multipoint connection and where the ROOT node has a corrupted point to multipoint view of the network.

First, the overlapping node realizes that it is, in fact, an overlapping node. The overlapping node continues with the establishment of the downstream path all the way to the destination user. The overlapping node forwards the SETUP message in accordance with the DTL stack in a conventional manner. Note that the SETUP message may be converted to an ADD PARTY message. In accordance with the PNNI standard, a SETUP message may remain a SETUP message or be converted to an ADD PARTY message but not vice versa. To the method of the present invention, however, it is irrelevant whether the call originated as a SETUP message or an ADD PARTY message.

The overlapping node then waits for the SETUP/ADD PARTY CONNECT to be received before continuing with the call procedure. Once the CONNECT is received, the overlapping node establishes an end point reference path to the point to multipoint root node over existing branches. Then, the overlapping segments are trimmed from the tree.

There is provided in accordance with the present invention, in an Asynchronous Transfer Mode (ATM) network having a plurality of nodes, a method of removing overlapping branches created when a leaf node is added to an already established point to multipoint call whereby a root node calculates a route for the new leaf node utilizing a corrupted point to multipoint view which results in the existence of one or more overlapping nodes, the method comprising the steps of recognizing that the route calculated route for adding the new leaf node to the point to multipoint call produces one or more overlapping nodes on one or more overlapping branches, establishing a downstream path from the overlapping node to the leaf node to be added, receiving a confirmation from the leaf node by the overlapping node closest to the leaf node, establishing an end point reference path from the overlapping node to the root node over previously established point to multipoint branches, thus creating a new path to the leaf node that does not create any overlapping nodes and removing all overlapping segments from the point to multipoint call.

The step of recognizing utilizes the Network Call Correlation Identifier (NCCI) generated by the root node or any global unique identifier in determining that a node is an overlapping node.

The step of recognizing comprises the steps of receiving a call setup message for a point to multipoint call, comparing the Network Call Correlation Identifier (NCCI) in the setup message with NCCIs previously received and identifying the node as an overlapping node is a match is found. The step of establishing a downstream path comprises the step of sending an add party message to the subsequent node in accordance with the routing list if the node is part of an existing point to multipoint call.

The step of establishing a downstream path comprises the step of sending a setup message to the subsequent node in accordance with the routing list if the node is not part of an existing point to multipoint call. The step of receiving comprises the step of receiving a CONNECT message returned by the leaf node.

The step of establishing an end point reference path comprises the steps of receiving a call confirmation message, generating a unique overlap leaf reference number, sending a leaf setup request message in the upstream direction on the input port associated with the already established point to multipoint branch, the leaf setup message includes the overlap leaf reference number and a designated transit list, forwarding the leaf setup request message to the root node wherein each node along the path in the upstream direction including the root node adds itself to the designated transit list, sending an add party message downstream to the overlapping node so as to create a new path to the leaf node, the add party message including the overlap leaf reference number and the designated transit list, receiving the add party message at the overlapping node and searching for a match of the overlap leaf reference number, configuring the overlapping node for the new path of the point to multipoint call, sending an add party connect message upstream to the root node and configuring the root node to use the new path in response to receiving the add party connect message.

The step of removing all overlapping segments comprises the steps of sending an add party reject message upstream on the overlapping segment if the overlapping node is part of an existing point to multipoint call, sending a release message upstream on the overlapping segment if the overlapping node is not part of an existing point to multipoint call, releasing overlapping branches on the call path from the overlapping node to the root node, configuring the root node to utilize the new path rather than the path that includes one or more overlapping branches and sending an add party connect message to a root user connected to the root node.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ANSI | American National Standards Institute |
| ATM | Asynchronous Transfer Mode |
| CCITT | Comite Consulatif International Telegraphique et Telephonique |
| DS | Database Summary |
| DTL | Designated Transit List |
| SVCC | Switched Virtual Channel Connection |
| LIJ | Leaf Initiated Join |
| LSR | Leaf Setup Request |
| HBL | Hierarchical Binding List |
| NCCI | Network Call Correlation Identifier |
| EPR | End Point Reference |
| PGLE | Peer Group Leader Election |
| FDDI | Fiber Distributed Data Interface |
| FSM | Finite State Machine |
| IISP | Interim Inter-Switch Signaling Protocol |
| ILMI | Interim Local Management Interface |
| ITU | International Telecommunications Union |
| NNI | Net to Network Interface |
| OSPF | Open Shortest Path First |
| PGL | Peer Group Leader |
| PNNI | Private Network to Network Interface |
| IE | Information Element |
| PTSE | PNNI Topology State Element |
| PTSP | PNNI Topology State Packet |
| RCC | Routing Control Channel |
| SVC | Switched Virtual Circuit |
| UNI | User to Network Interface |
| VCC | Virtual Channel Connection |

General Description

Figure 1:
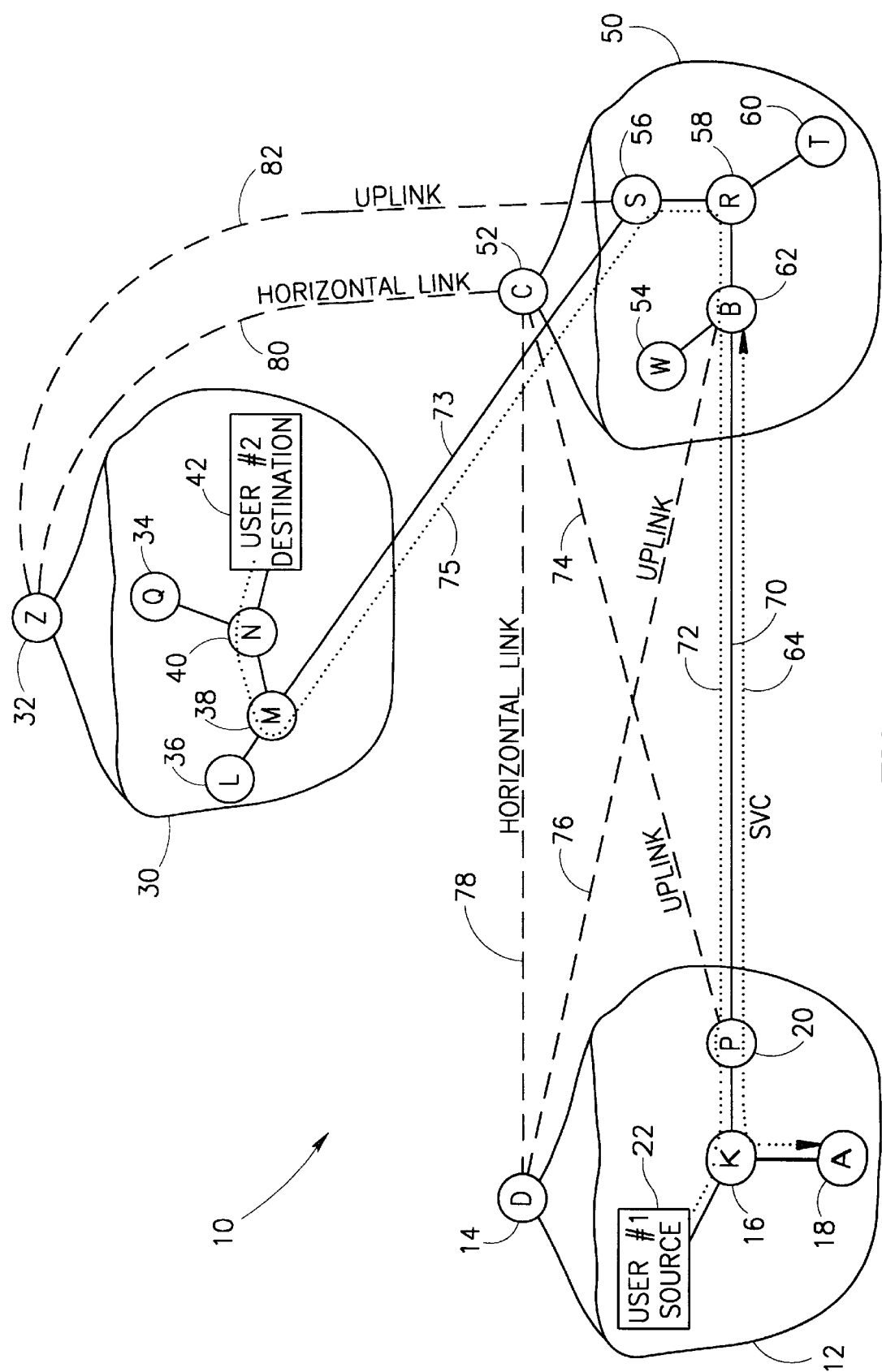
FIG. 1 is a diagram illustrating an example ATM network having three interconnected peer groups with selected peer group leaders.
Figure 2:
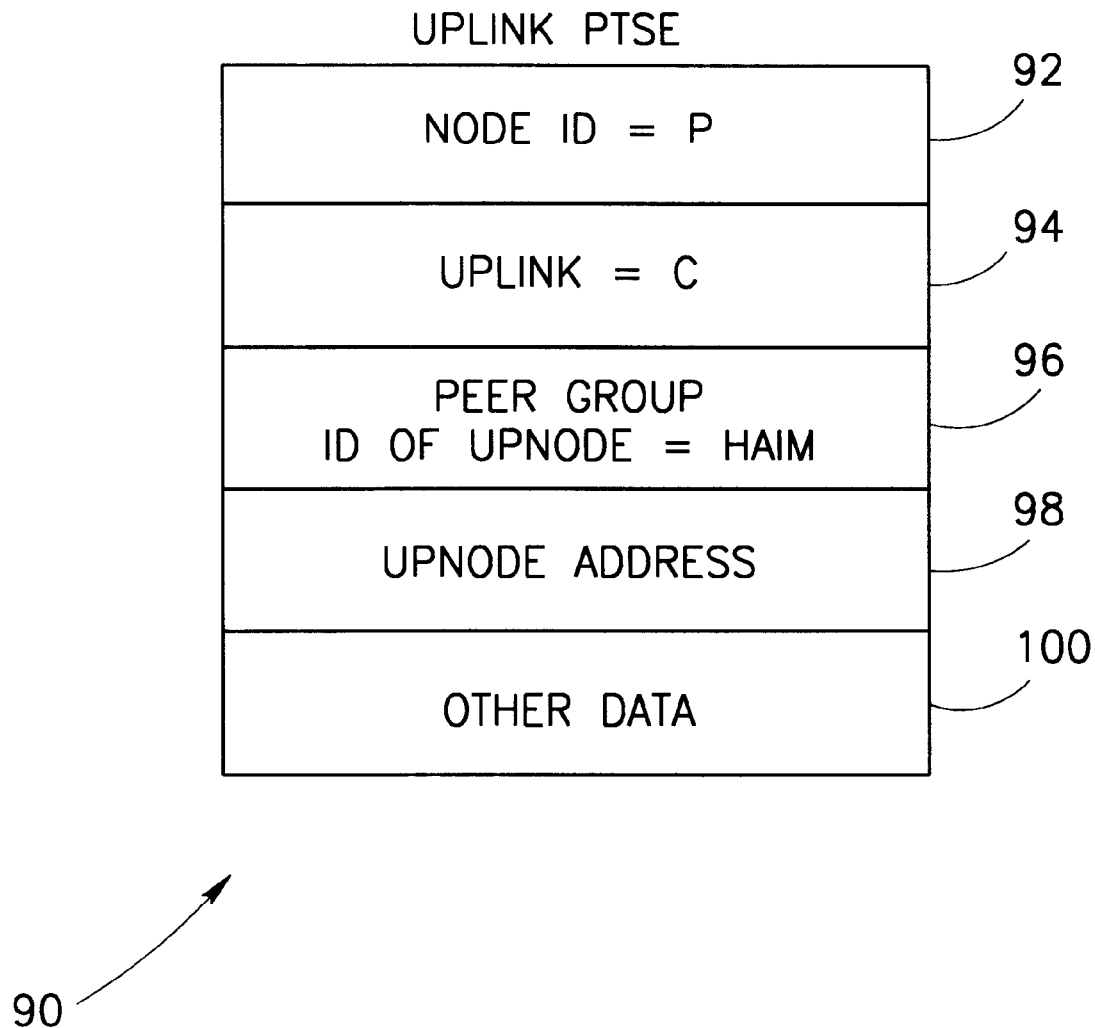
FIG. 2 is a diagram illustrating the structure of an uplink PTSE.
Figure 3:
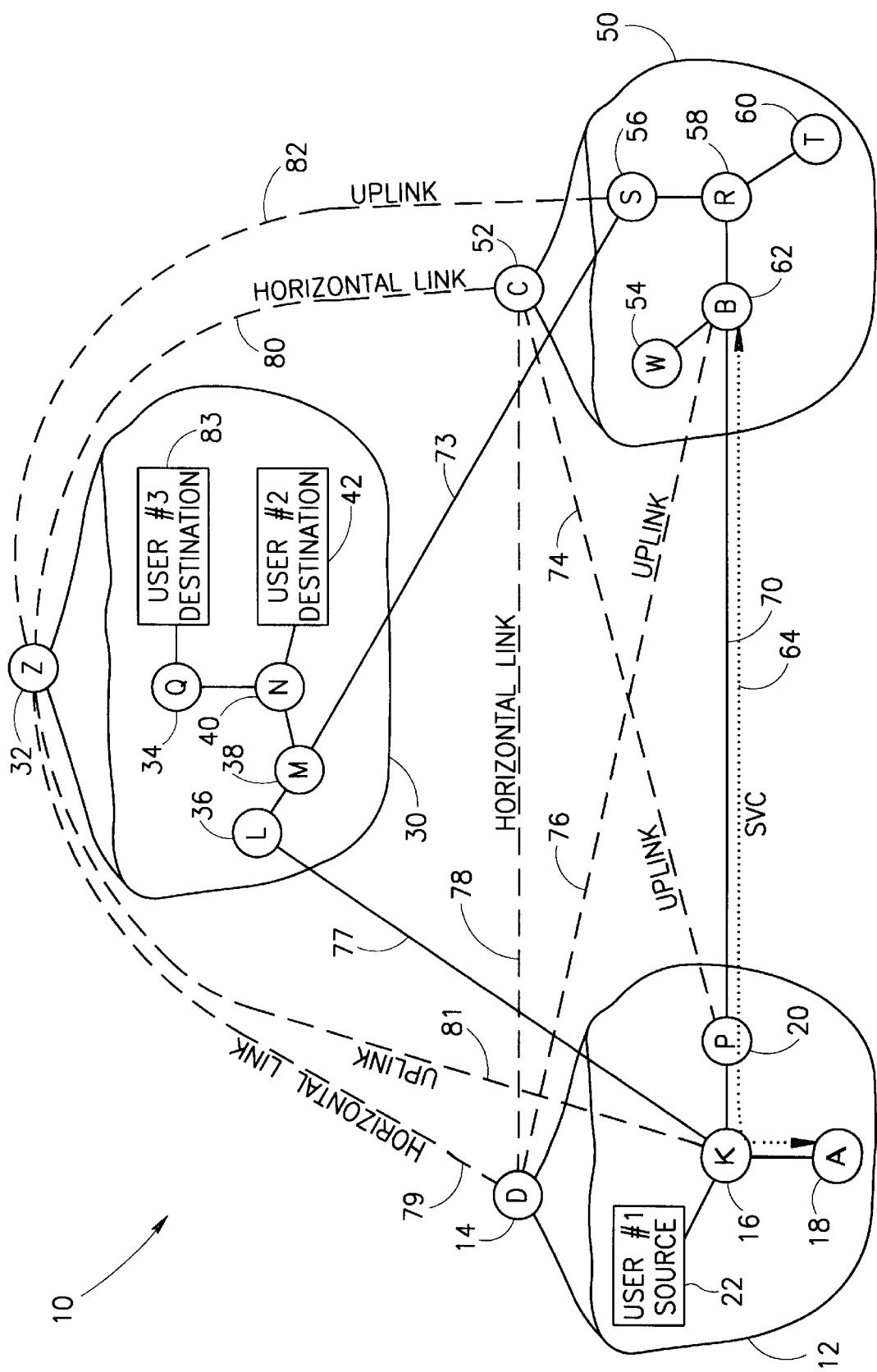
FIG. 3 is a diagram illustrating the example ATM network of FIG. 1 with an additional connection added between two of the peer groups.
Figure 4:
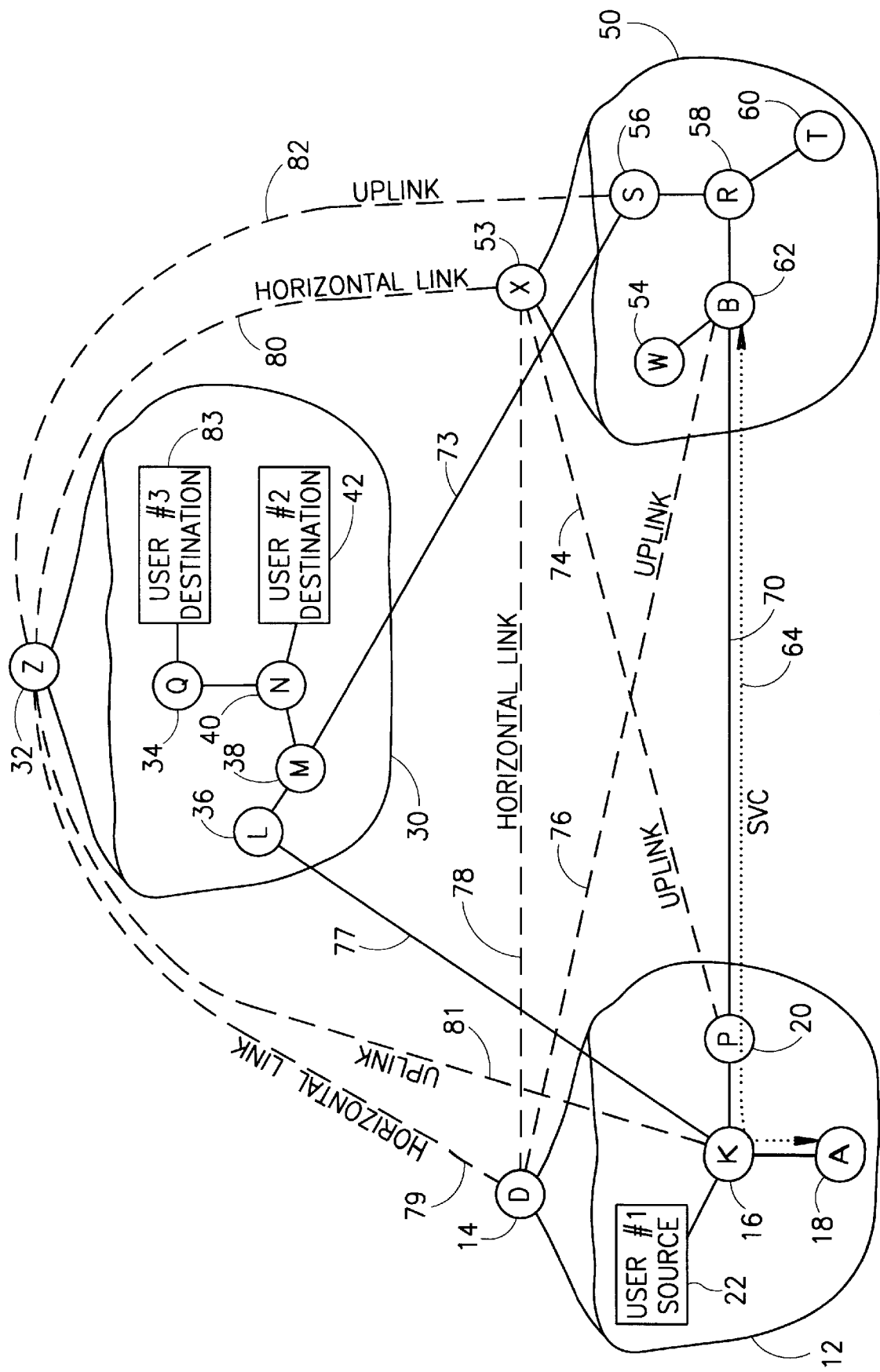
FIG. 4 is a diagram illustrating an example ATM network wherein one of the peer group leaders has been replaced with a different peer group leader.
Figure 5:
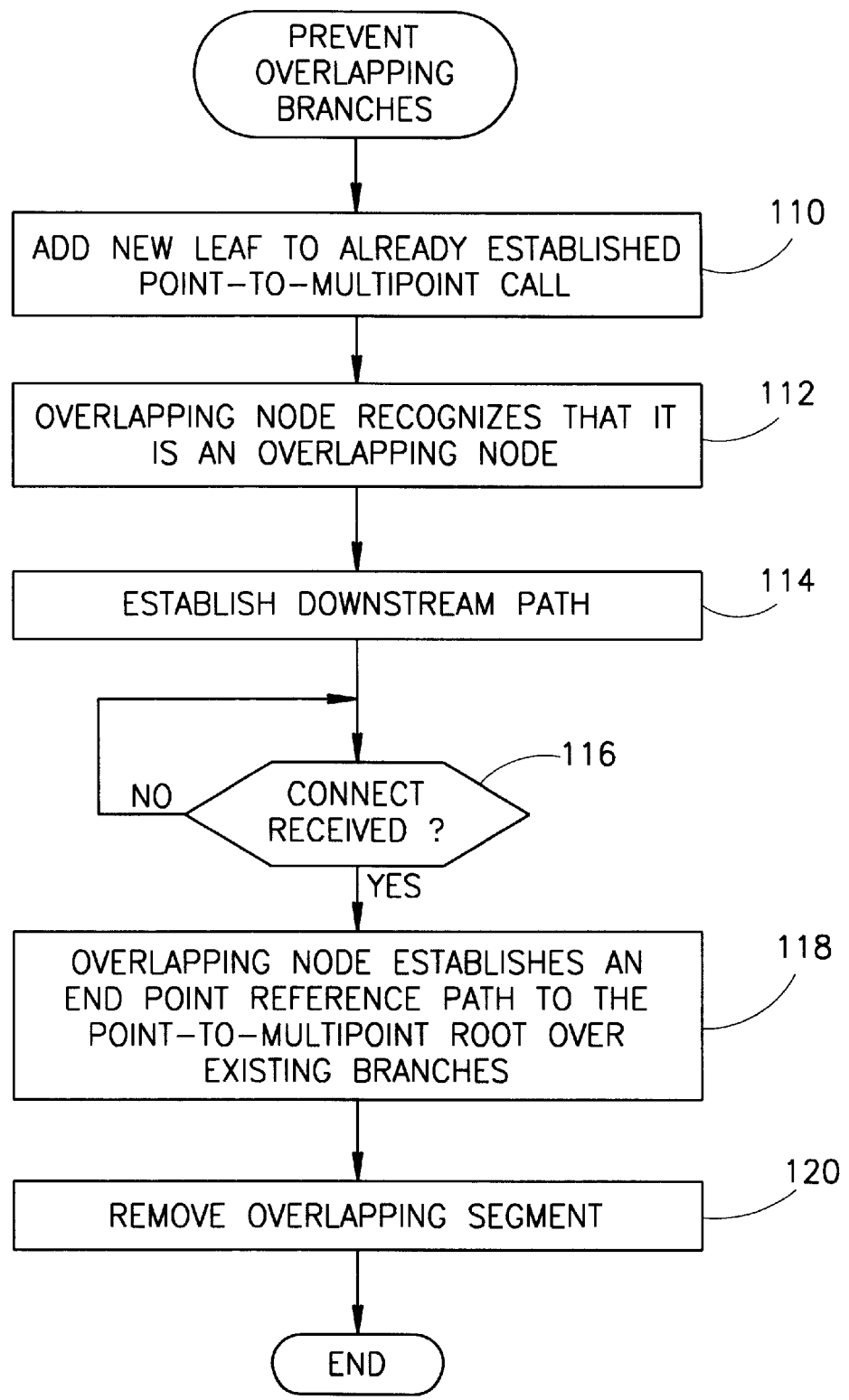
FIG. 5 is a flow diagram illustrating the method of the present invention of preventing overlapping branches in a point to multipoint network.

The method of the present invention provides a solution to the problem of overlapping branches described above in the Background of the Invention section. The method is suitable for non Leaf Initiated Joins (LIJ) to an existing point to multipoint call. Note that all the nodes up to the ROOT node must support the method of the present invention in order for the overlapping node feature of the invention to work. A flow diagram illustrating the method of the present invention of preventing overlapping branches in a point to multipoint network is shown in FIG. 5. It is assumed that a new leaf is to be added to an already existing point to multipoint connection (step 110). It is also assumed that the ROOT node has a corrupted point to multipoint view of the network. The first step is that the overlapping node realizes that it is, in fact, an overlapping node (step 112). The overlapping node will continue with the establishment of the downstream path (step 114). The overlapping node forwards the SETUP message in accordance with the DTL. It is possible that the SETUP message will be converted to an ADD PARTY message. Note that in accordance with the PNNI standard, a SETUP message may remain a SETUP message or be converted to an ADD PARTY message but not vice versa. To the method of the present invention, it is irrelevant whether the call originated as a SETUP message or an ADD PARTY message.

The overlapping node then waits for the SETUP/ADD PARTY CONNECT to be received before continuing with the call procedure (step 116). Once the CONNECT is received, the overlapping node establishes an end point reference path to the point to multipoint root node over existing branches (step 118). Then, the overlapping segments are trimmed from the tree (step 120).

It is important to note that with the method of the present invention a network leaf initiated join (LIJ) that created an overlapping branch condition will end up as a root LIJ. This happens since it is not known at the overlapping node whether the request is a LIJ or a regular leaf join at the root node, in which case the root node waits for confirmation. Thus, it is preferable to traverse the connection path all the way back to the root node since the root node has knowledge of the type of join.

Figure 6:
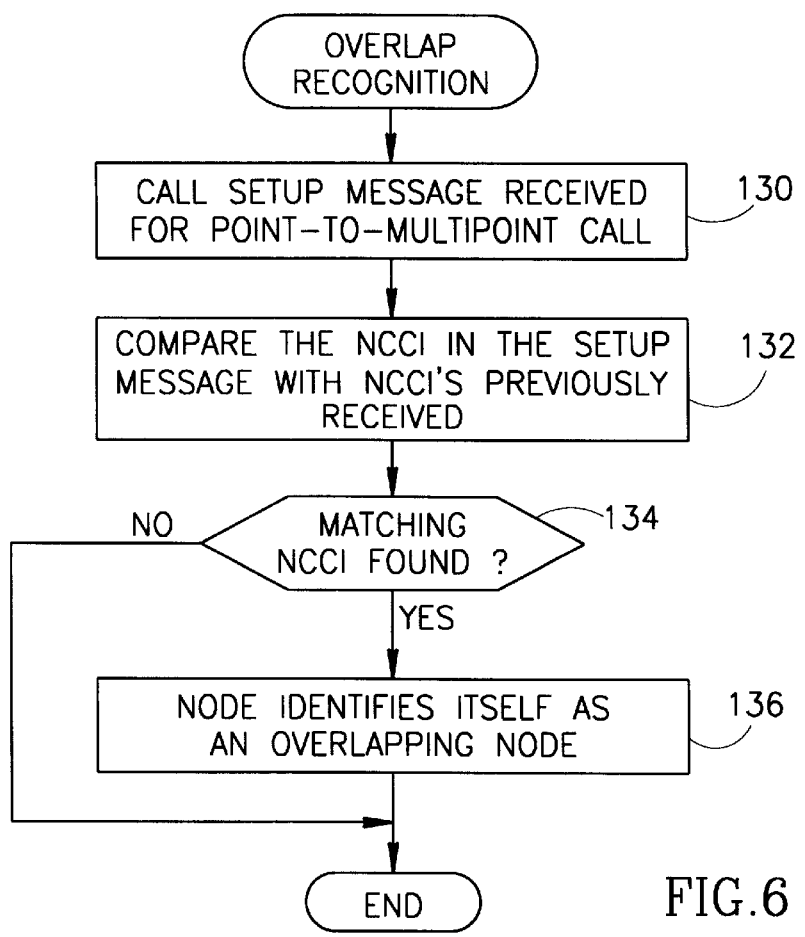
FIG. 6 is a flow diagram illustrating in more detail the method of recognizing an overlap condition on a node.

A flow diagram illustrating in more detail the method of recognizing an overlap condition on a node is shown in FIG. 6. The first step is that a call SETUP message is received for a point to multipoint call (step 130). A unique global identifier is required to be associated with each point to multipoint call on the nodes that it is desired to support the method of the present invention. One alternative is to use the NCCI identifier of the incoming port of the point to multipoint connection at the root node, the root node being the node connected to the user who generates the data traffic. In a second alternative, a server accessible to the network can be used which generates and distribute globally unique identifiers.

Assuming the first alternative is used, the NCCI in the SETUP message, once received, is compared with NCCIs previously received and stored in the node (step 132). If a match is found (step 134) the node identifies itself as an overlapping node (step 136). Note that a node can only identify itself as an overlapping node upon receipt of a SETUP message. If an ADD PARTY message is received it means that the point to multipoint call is on a route that includes already existing branches.

Figure 7:
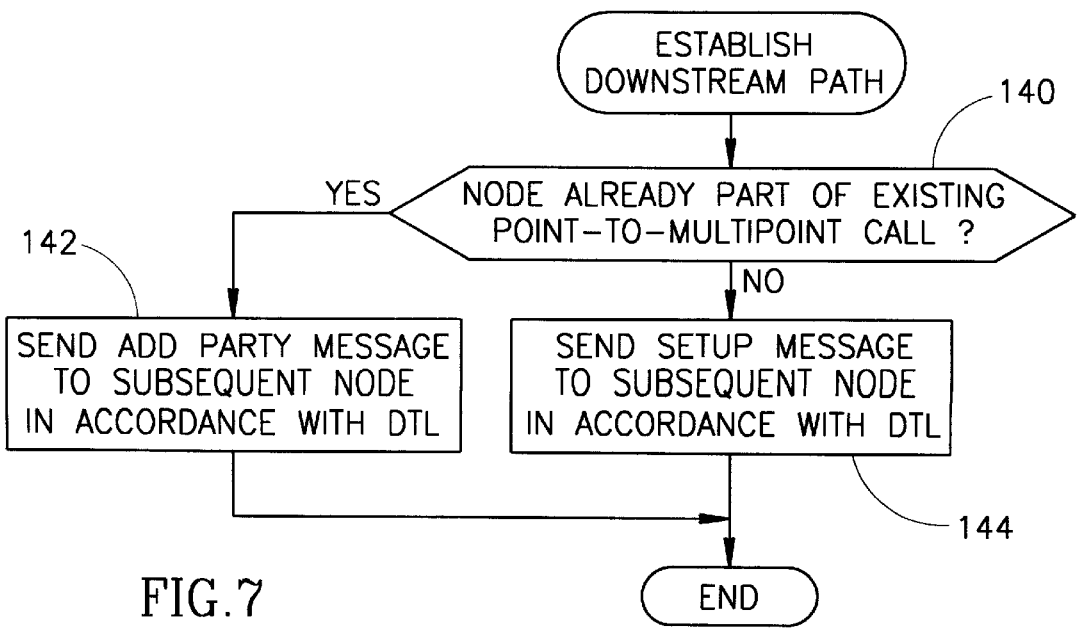
FIG. 7 is a flow diagram illustrating in more detail the method of establishing a downstream path.

Once the node recognizes that it is an overlapping node, the call processing flow continues with the establishment of the remaining downstream path. A flow diagram illustrating in more detail the method of establishing a downstream path is shown in FIG. 7. If the node that receives the SETUP message is already part of an existing point to multipoint call (step 140) then it sends an ADD PARTY message to the subsequent node in accordance with the DTL (step 142). If the node is not already part of an existing point to multipoint call, then the node sends a SETUP message to the subsequent node in accordance with the DTL (step 144). If the node receives an ADD PARTY message, it forwards it as usual to the subsequent node in accordance with the DTL. Note that under the present invention, a SETUP message may be converted to an ADD PARTY message if the overlapping node is already part of a point to multipoint call.

At some point, the destination node receives the ADD PARTY/SETUP message and forwards it to the destination user. The destination user replies with a CONNECT message which is forwarded back upstream to the overlapping node. Note that there may be more than one overlapping node, in which case, the overlapping node closest to the destination user will perform the method of the present invention. This is due to the fact that the overlapping node forwards the ADD PARTY/SETUP message that it received, i.e., that caused the overlapping condition in the first place, in the downstream direction towards the destination user. The overlapping node then waits for a confirmation of a connect. Thus, the overlapping node closest to the destination user will be the first to receive the confirmation, i.e., CONNECT message. And will be the node to release the overlapping segment.

Figure 8A:
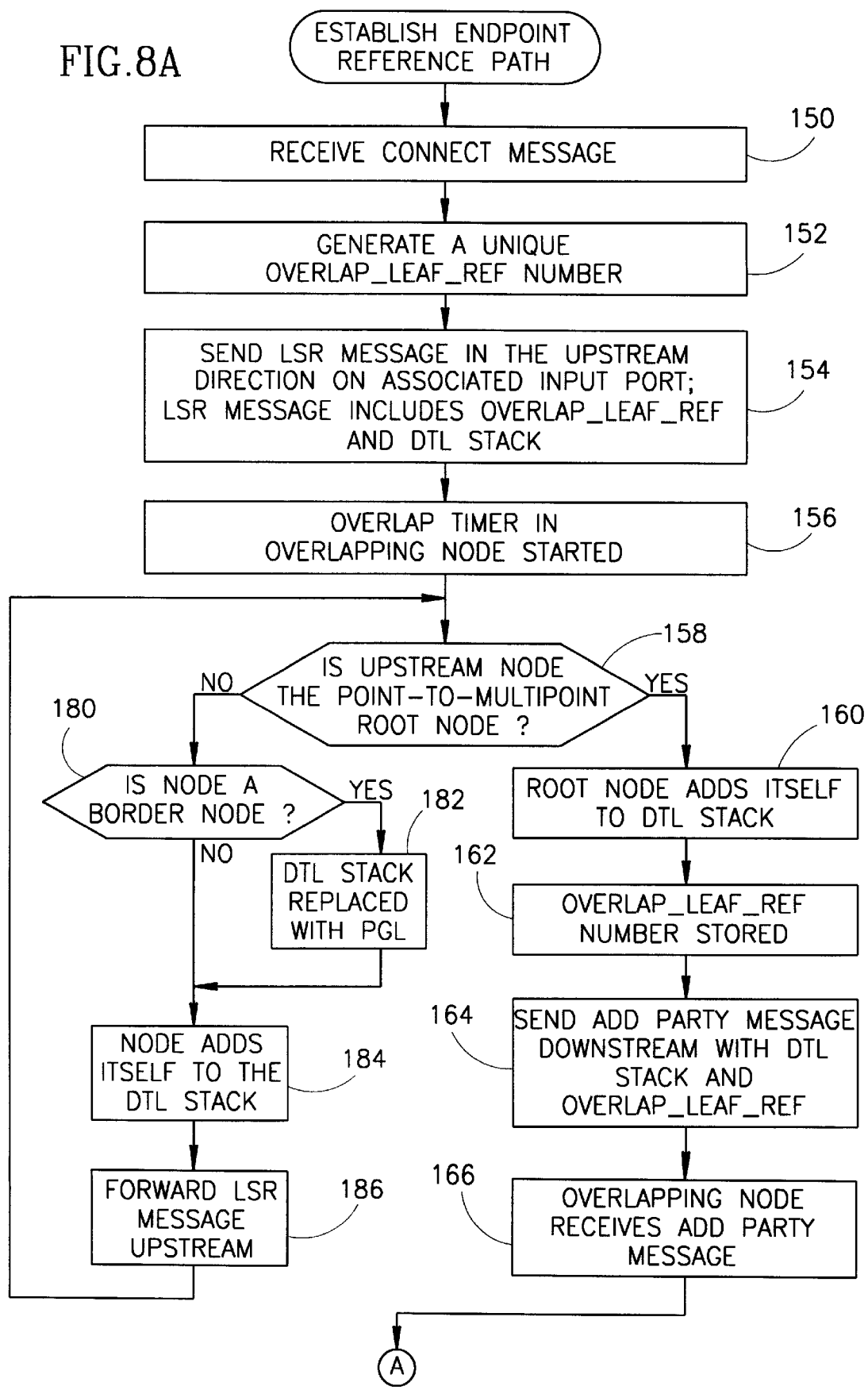
FIGS. 8A and 8B is a flow diagram illustrating in more detail the method of establishing an endpoint reference path.
Figure 8B:
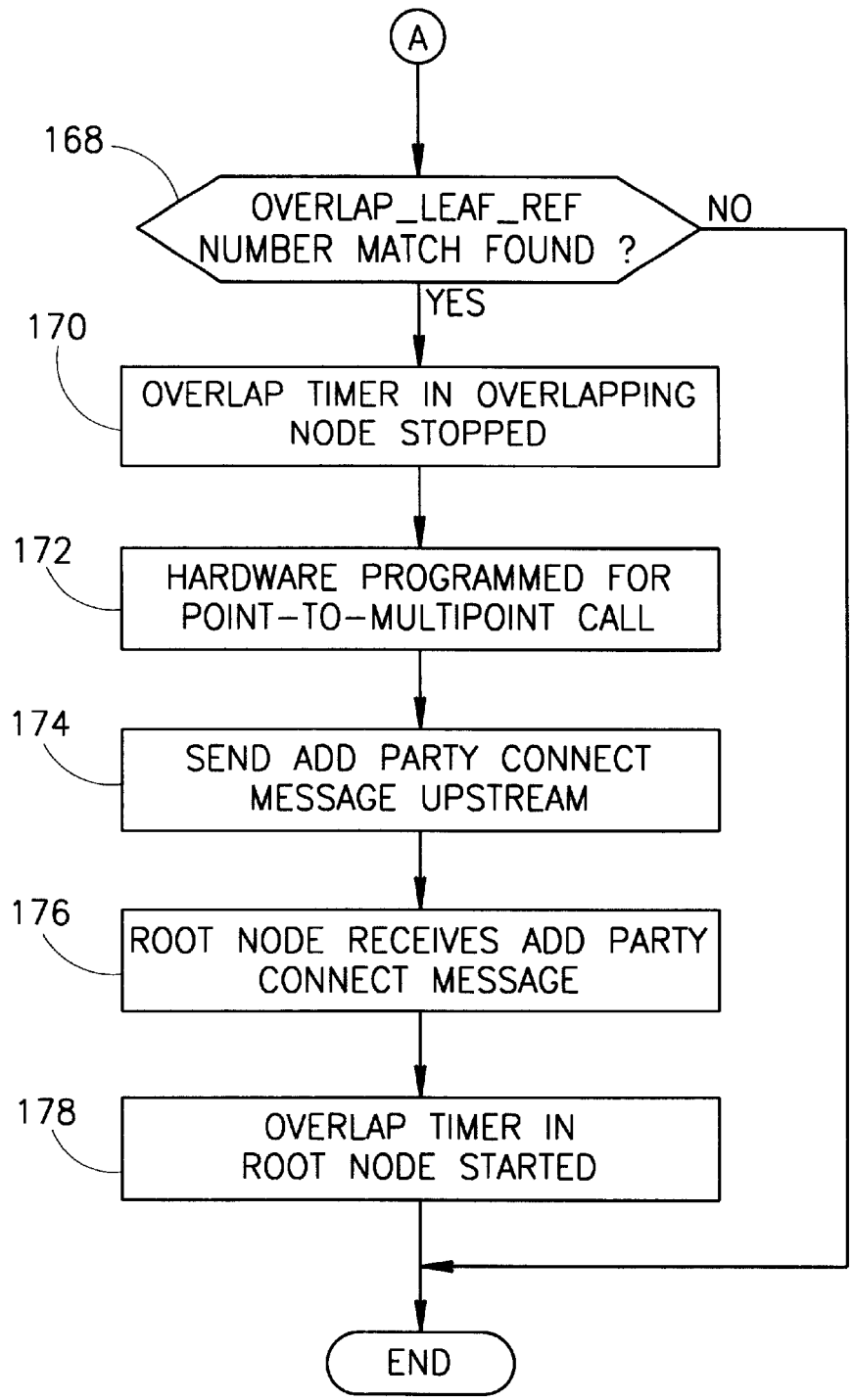

The method of establishing the endpoint reference will now be described in more detail. A flow diagram illustrating in more detail the method of establishing an endpoint reference path is shown in FIGS. 8A and 8B. Once the overlapping node closest to the destination user receives the confirmation, i.e., the CONNECT message, (step 150), the overlapping node then generates a unique OVERLAP_LEAF_REF number (step 152). Note that the OVERLAP_LEAF_REF number should be unique over the entire network similarly to the global NCCI number. A Leaf Setup Request (LSR) message is then generated and sent in the upstream direction on the input port associated with the already established branch of the point to multipoint call path (step 154). The LSR message includes the unique OVERLAP_LEAF_REF number and an DTL stack that includes only the overlapping node. Note that the OVERLAP_LEAF_REF is a unique number that the overlapping node generates which is used subsequently to match to the ADD PARTY message received with the corrected DTL.

The overlapping node then starts an overlap timer (OVERLAP_TIMER) running (step 156). The overlap timer is used either to determine a failure of the LSR or for waiting for an ADD PARTY message from the root node containing the unique OVERLAP_LEAF_REF.

As described above, the LSR message is sent upstream in the direction of the root node. Each node along the path receives the LSR message and checks whether it is the root node (step 158). Note that this step changes the way nodes handle the LSR as compared with the standard in that the LSR message must be sent to the ROOT node associated with the call and not the proxy root in charge of the leaf's domain.

If the node is not the root node, i.e., the corresponding incoming port is an PNNI port as opposed to a UNI port, it is then determined whether the node is a border node (step 180). If the node is a border node, the DTL stack is replaced with the Peer Group Leader (PGL) node address (step 182). If the node is not a border node, the nodes adds its address to the end of the DTL stack (step 184) and forwards the LSR message to the next node in the upstream direction (step 186). This step is an important feature of the present invention. The DTL stack is constructed in this manner because the standard DTL generators, i.e., the originating nodes, have an incorrect view of the point to multipoint call which will not change until the call is terminated completely. Thus, if the DTL was constructed in a conventional manner, the same call path with the overlapping branch would be generated.

In the event a race condition occurs, when the node is not a ROOT node and the overlapping branch was already trimmed via a RELEASE message from the upstream direction, then either (1) a LSR failure message is sent in the downstream direction or (2) nothing is done to permit the OVERLAP_TIMER in the overlapping node to expire. In either case, the overlapping branch may be permitted or may be removed in accordance with the configuration of the nodes as set by the network administrator.

If the node is the root node (step 158), the root node adds itself to the DTL stack (step 160) and stores the OVERLAP_LEAF_REF number (step 162). The root node then sends an ADD PARTY message downstream with the OVERLAP_LEAF_REF number and the DTL stack that it received with the LSR and subsequently added itself to (step 164). The intermediate nodes along the path forward the ADD PARTY message in accordance with the DTL stack. Note that the message sent back downstream must be an ADD PARTY message since the entire path between the root and the overlapping node is part of an already established point to multipoint call. When the overlapping node receives the ADD PARTY message (step 166), it checks for a match between the OVERLAP_LEAF_REF number in the ADD PARTY message and the number that it generated previously when it sent the LSR (step 168).

If a match is not found, the method exits. If a match is found, the OVERLAP_TIMER in the overlap node is stopped (step 170) and the switch hardware in the overlapping node is configured for a point to multipoint call (step 172). This creates a correct point to multipoint path for the call. An ADD PARTY CONNECT is then generated and sent upstream (step 174). The ADD PARTY CONNECT message is forwarded upstream until the ROOT node receives it (step 176). Upon receipt, the root node starts an OVERLAP_TIMER running (step 178). Note that an ADD PARTY or SETUP message does need to be sent to the destination user as this portion of the call was already established previously. It was the confirmation message being received by the overlapping node that triggers the method.

Figure 9A:
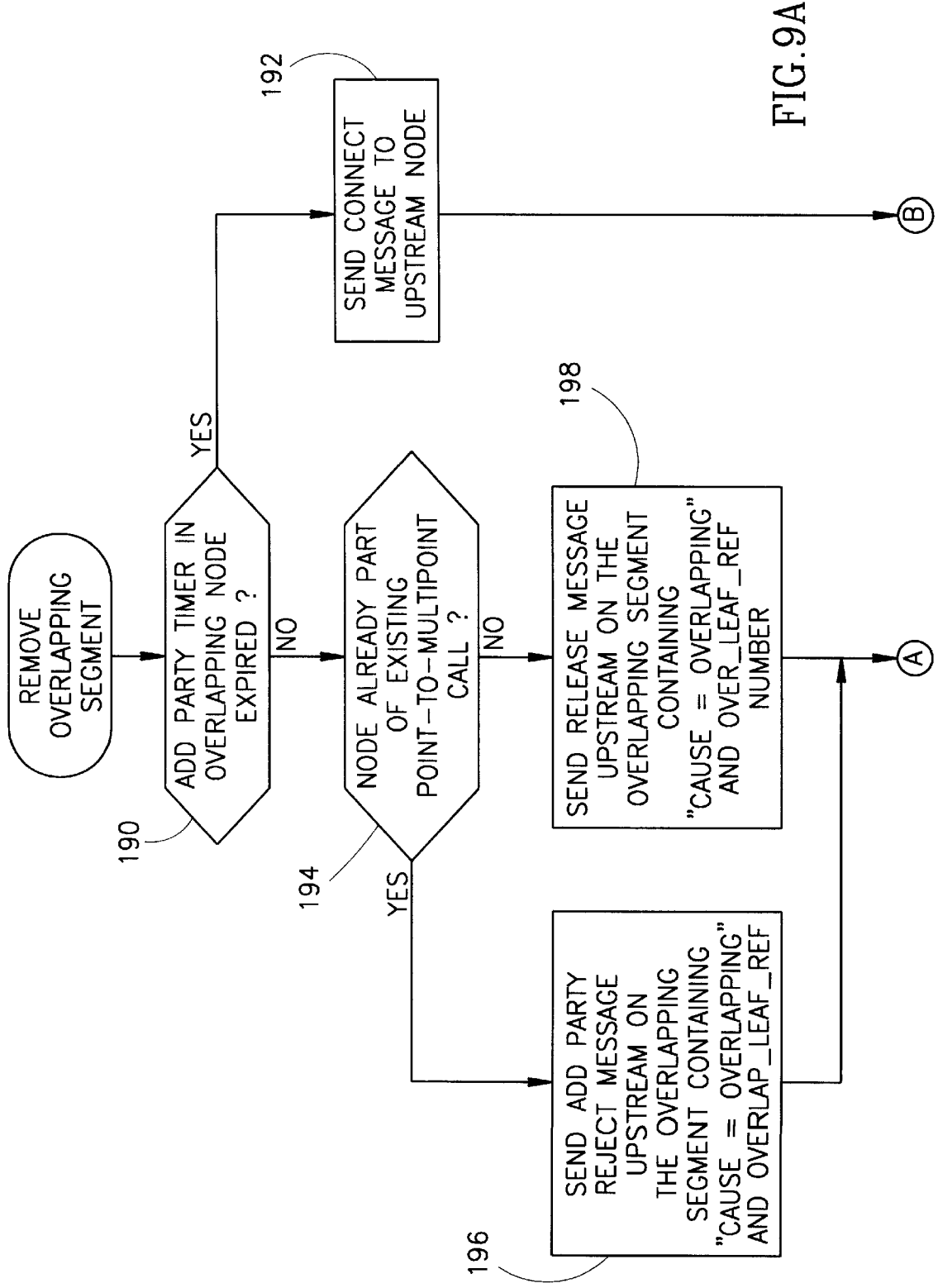
FIGS. 9A and 9B is a flow diagram illustrating in more detail the method of removing an overlapping segment after the path as been re-established.
Figure 9B:
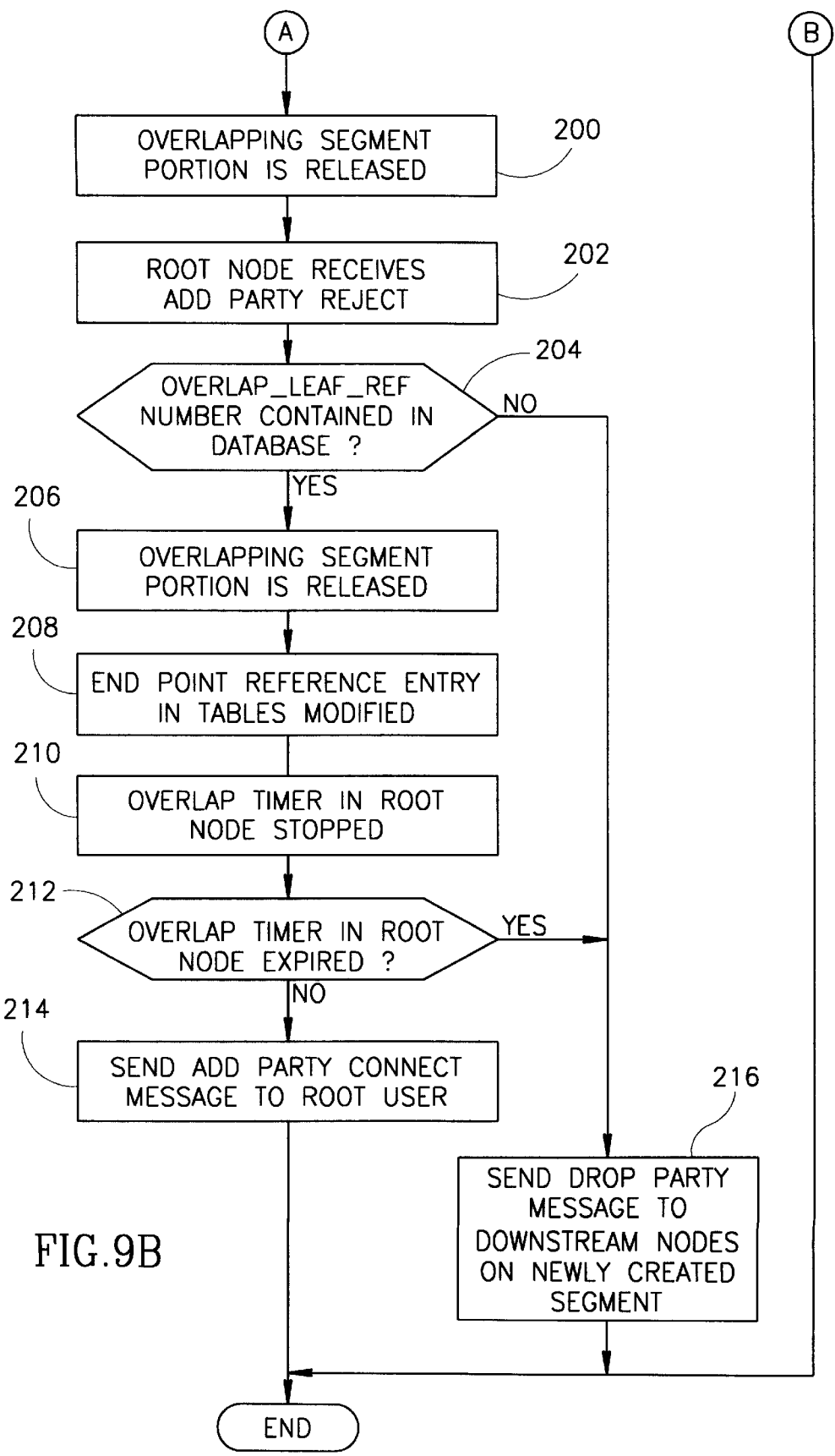

Once the correct point to multipoint path is built, the overlapping branch segment must be removed. A flow diagram illustrating in more detail the method of removing an overlapping segment after the path as been re-established is shown in FIGS. 9A and 9B. Initially, it is checked whether the OVERLAP_TIMER in the overlapping node expired (step 190). If so, a CONNECT message is sent in the upstream direction (step 192) and the method terminates. This could happen in the event one or more messages are lost or some of the nodes along the path do not support the features of the present invention.

As long as the OVERLAP_TIMER in the overlapping node did not expire, it is checked whether the node is part of an existing point to multipoint call (step 194). If the node is part of an already established point to multipoint call, the node sends an ADD PARTY REJECT message upstream on the input port associated with the overlapping path segment (step 196). The REJECT message contains (1) an indication that the cause of the reject is due to an overlapping branch condition and (2) the OVERLAP_LEAF_REF number.

If the node is not part of an already established point to multipoint call, the node sends a RELEASE message upstream on the input port associated with the overlapping path segment (step 198). The REJECT message contains (1) an indication that the cause of the reject is due to an overlapping branch condition and (2) the OVERLAP_LEAF_REF number. In response to the reject message, the overlapping segment is released (step 200). In this fashion, at each node hop along the way, the corresponding segment of the overlapping branch is released.

Ultimately, the ROOT node receives the ADD PARTY REJECT message (step 202), since the ROOT must be connected to a segment that is already part of a point to multipoint call. Once the ADD PARTY REJECT message is received, it is checked is the OVERLAP_LEAF_REF number matched any of the numbers in the ROOT node's database (step 204). The overlapping segment portion of the call is then released (step 206). The end point reference entry in the switching tables are modified accordingly (step 208).

The OVERLAP_TIMER in the ROOT node is stopped (step 210) and if it has not already expired (step 212), an ADD PARTY CONNECT message is sent to the root user (step 214). The ADD PARTY REJECT message of the present invention is converted to an ADD PARTY CONNECT message which finally is sent to the root user.

If the OVERLAP_TIMER in the root node as already expired, a DROP PARTY message is sent to the downstream nodes on the newly created segment (step 216). Note that if the OVERLAP_TIMER in the root node expires or the OVERLAP_PEAF_REF number in the ADD PARTY message is not in the root node's database, it means that the previously created call path (created on the correct view of the point to multipoint call) should be torn down. If it remains, then two paths are permitted to exist between the ROOT node and the overlapping node.

Figure 10:
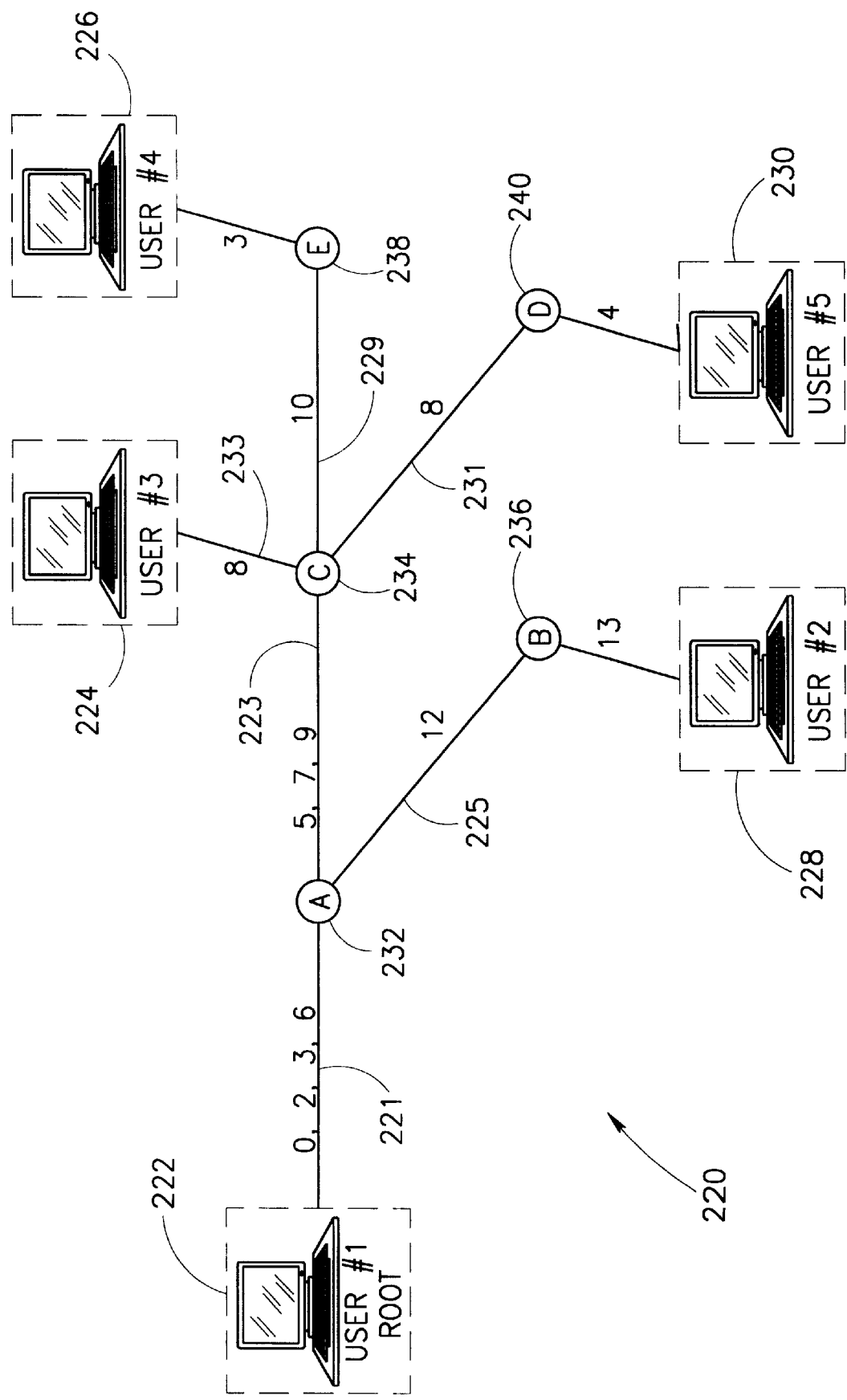
FIG. 10 is a diagram of an example point to multipoint network presented to illustrate the principles of the present invention.

To aid in understanding the principles of the method of the present invention, an illustrative example will now be presented. A diagram of an example point to multipoint network presented to illustrate the principles of the present invention is shown in FIG. 10. The example network, generally referenced 220, comprises a plurality of nodes. It is assumed that a point to multipoint has already been established. The point to multipoint view is shown comprising five nodes: A 232, B 236, C 234 D 240 and E 238. A plurality of users are coupled as follows: root user #1 222 connected to node A; user #2 228 connected to node B;

user #3 224 connected to node C; user #3 226 connected to node E and user #5 230 connected to node D.

The links between the nodes that are part of the point to multipoint call are shown labeled with the end point reference numbers for each user. The end point reference numbers are assigned independently by each node and are used to associated input ports and output ports in relation to the physical links connected to the node. In particular, end point reference numbers 0, 2, 3, 6 shown on the link between the root user #1 and node A are associated with the connections to users #2, #3, #4, #5, respectively. End point reference numbers 5, 7, 9 shown on the link between node A and node C are associated with the connections to users #3, #4, #5, respectively, and so on. As an example, Table 8 below is the End Point Reference Table for node A which has three links connected to it: 221, 223, 225.

TABLE 8

| Link 221 | Link 223 | Link 225 |
|---|---|---|
| 0 | | 12 |
| 2 | 5 | |

TABLE 8-continued

| Link 221 | Link 223 | Link 225 |
|---|---|---|
| 3 | 7 | |
| 6 | 9 | |

Similarly, the End Point Reference Table for node C which have four links 223, 229, 231, 233 connected to it is also shown below in Table 9.

TABLE 9

| Link 223 | Link 229 | Link 231 | Link 233 |
|---|---|---|---|
| 5 | | | 8 |
| 7 | | 8 | |
| 9 | 10 | | |

Figure 11:
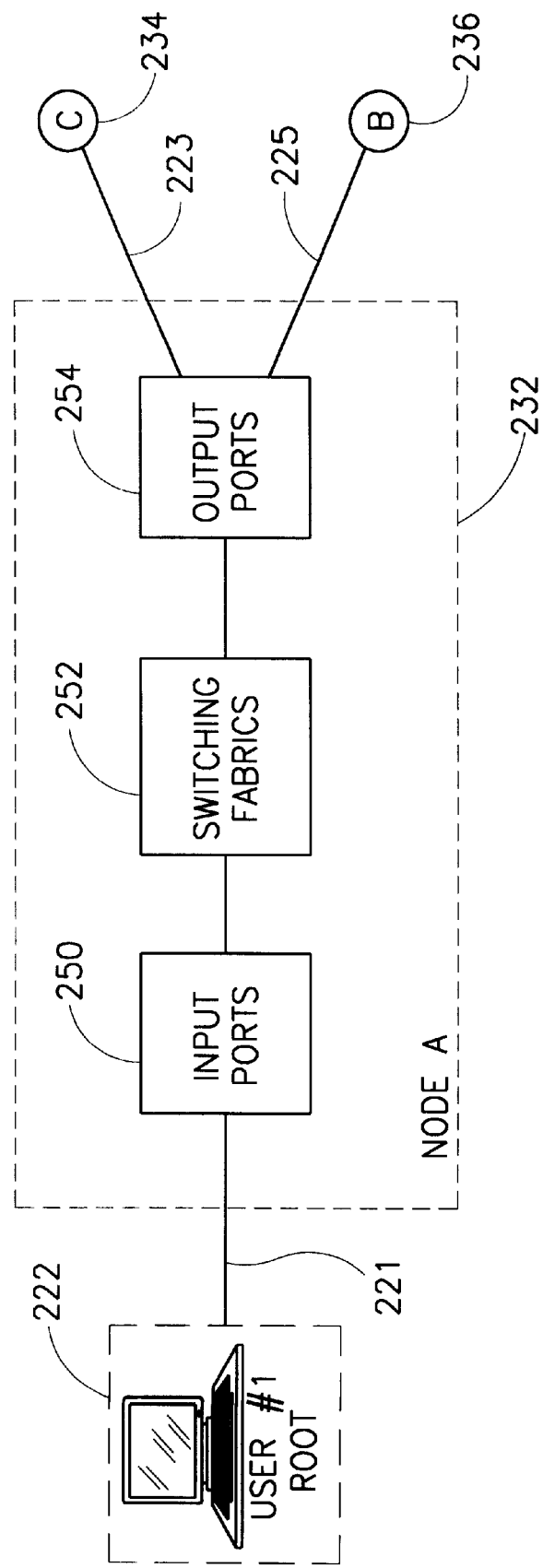
FIG. 11 is a block diagram illustrating the structure of the nodes in the point to multipoint network in more detail.

A block diagram illustrating the structure of the nodes in the point to multipoint network in more detail is shown in FIG. 11. In particular, node A 232 is shown comprising input port means 250, switching fabric 252 and output port means 254. The root user #1 222 is connected to the input port means 250 via link 221 and the output port means is connected to nodes 234, 236 via links 223, 225, respectively.

Figure 12:
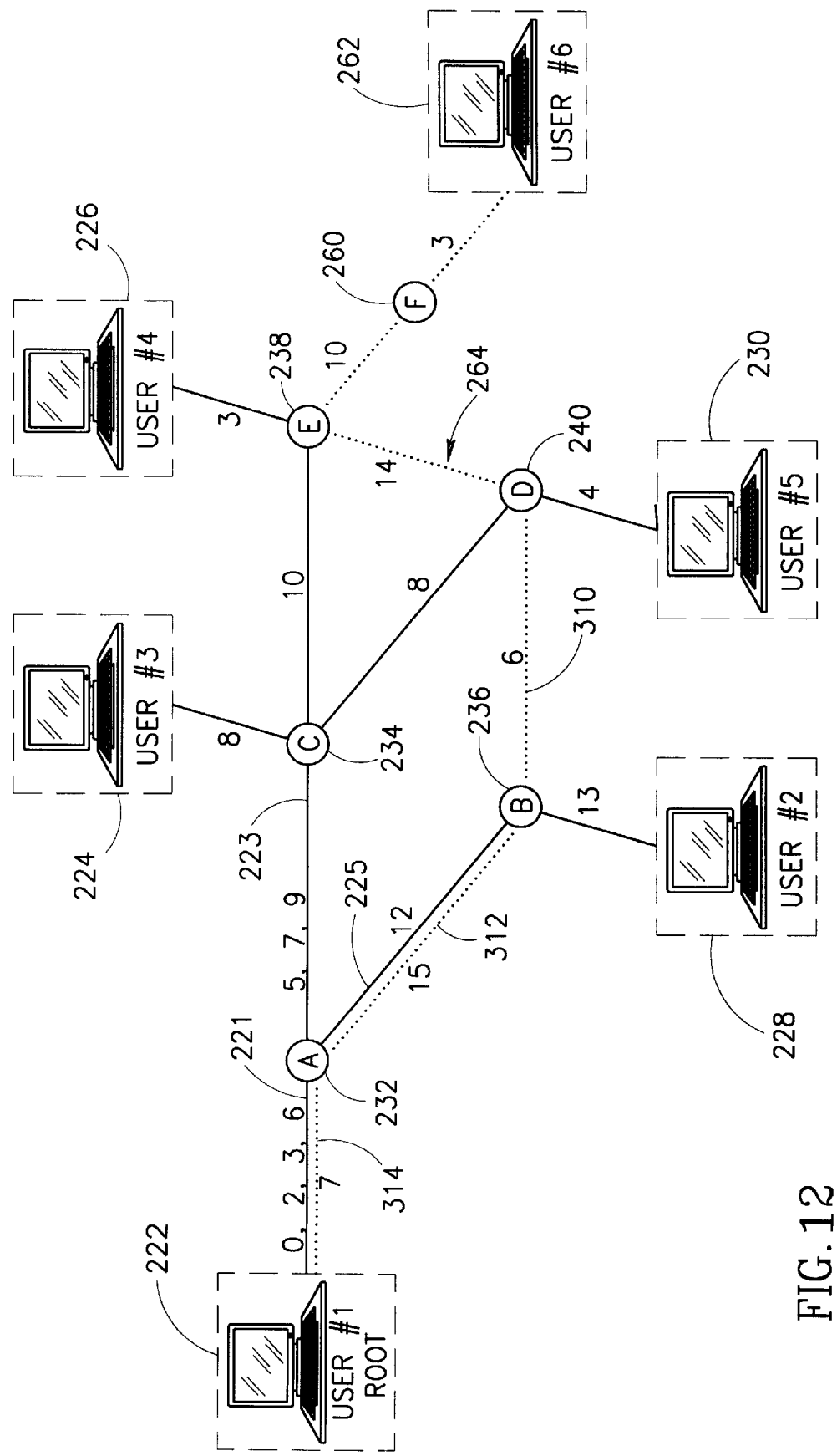
FIG. 12 is a diagram illustrating the addition of a new leaf in the example point to multipoint network wherein overlapping branches are created.

Now assume that a sixth user has been added as a new leaf to the existing point to multipoint call. A diagram illustrating the addition of a new leaf in the example point to multipoint network wherein overlapping branches are created is shown in FIG. 12. User #6 262 is connected to node F 260. The route calculation for the new leaf, however, has resulted in a path that creates an overlapping branch. The route is referenced 264 and is shown by the dotted line connecting the root user #1 and user #6. Node E is an overlapping node and in combination the other nodes in the view will utilize the method of the present invention to reroute the connection to user #6 and remove the overlapping branch.

The end point reference numbers associated with the newly added leaf (user #6) have been added to the view. In particular, end point reference number 7 is assigned to the segment 314 between the root user #1 and node A; end point reference number 15 to the segment 312 between node A and node B; end point reference number 6 to the segment 310 between node B and node D and so on to the user #6.

Figure 13:
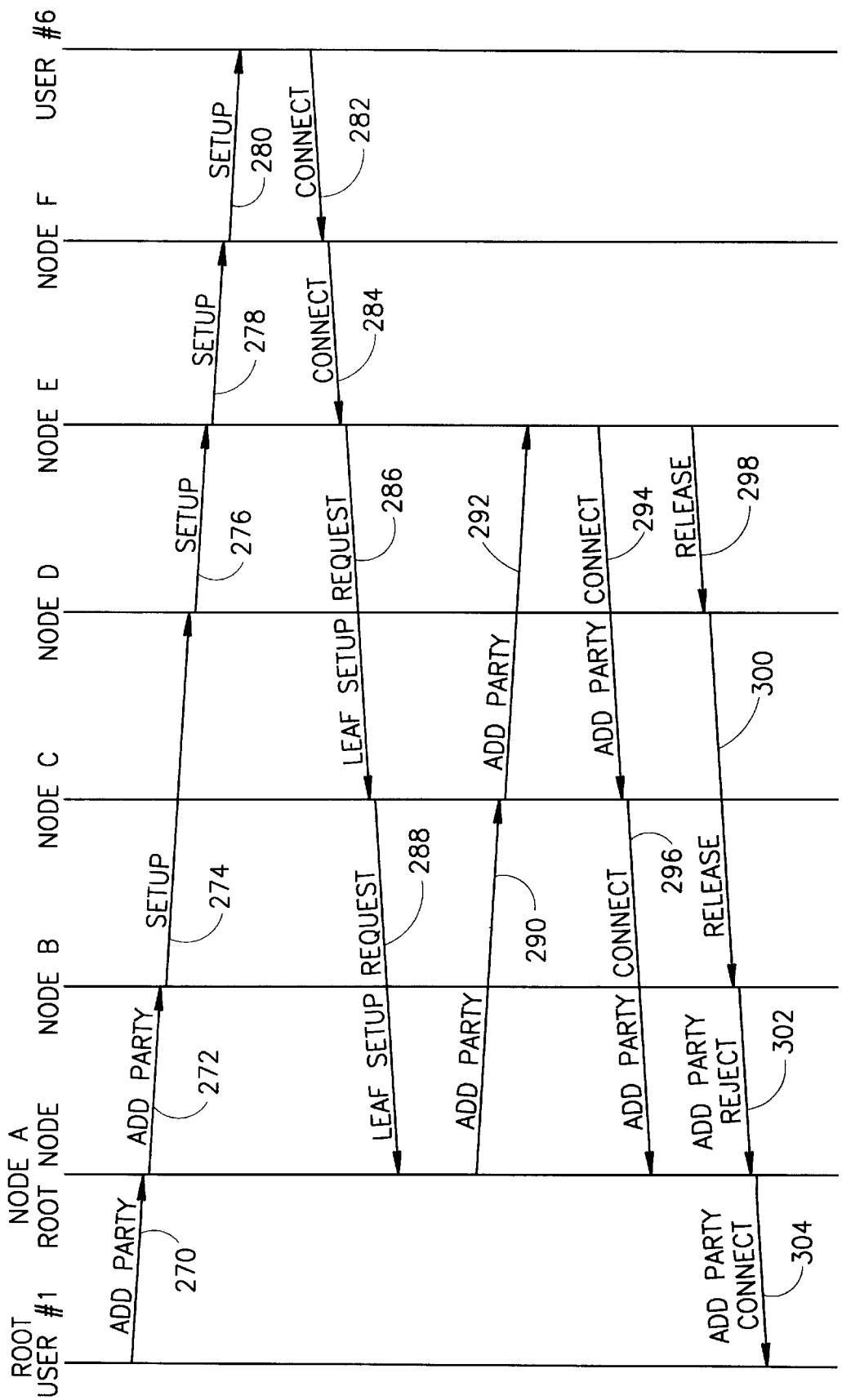
FIG. 13 is a diagram illustrating the message flow between the various users and nodes in the example point to multipoint network.
Figure 14:
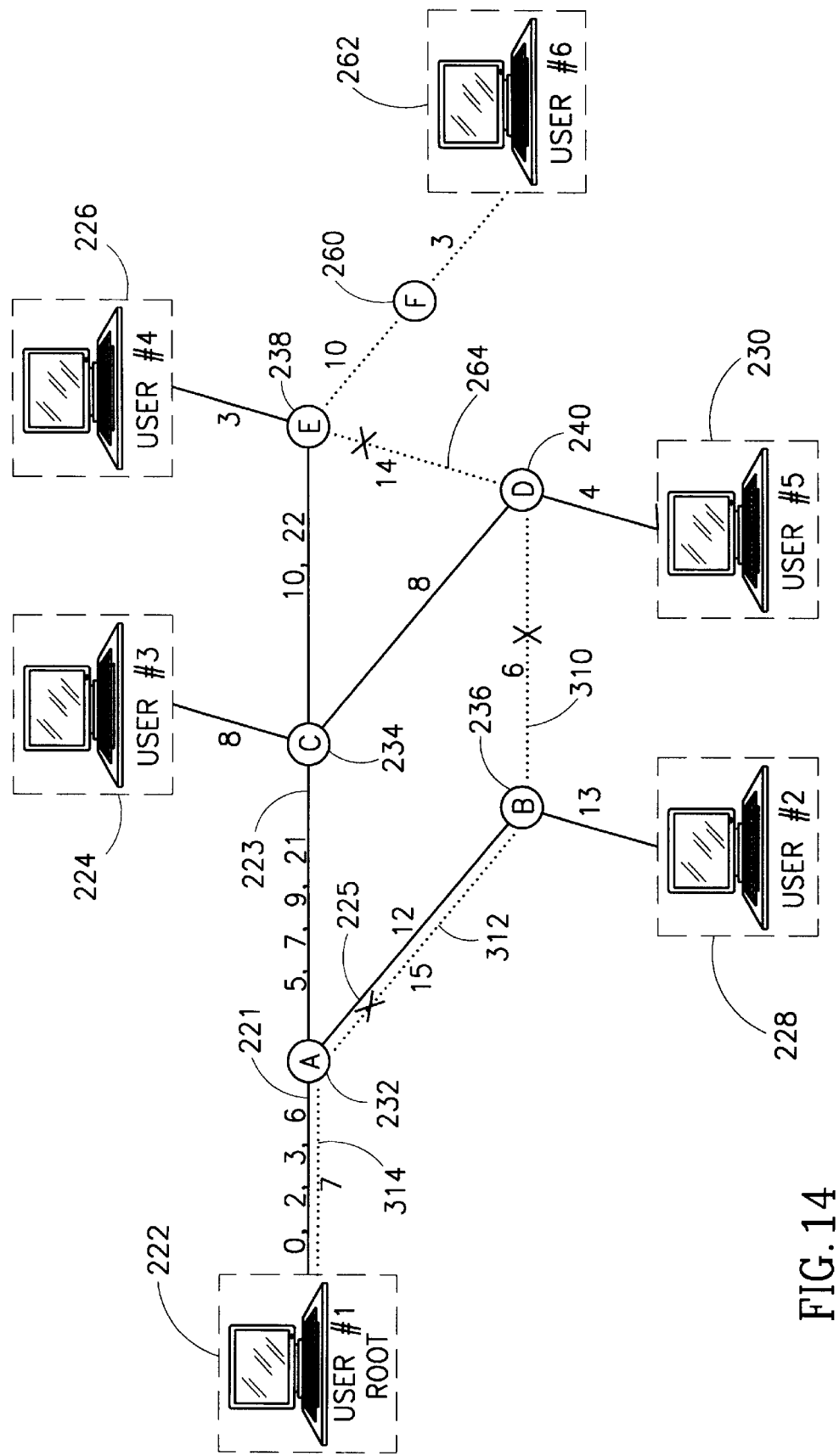
FIG. 14 is a diagram of the example point to multipoint network after re-establishment the path and the elimination of the overlapping branches.

A diagram illustrating the message flow between the various users and nodes in the example point to multipoint network is shown in FIG. 13. The message flow is described with reference to FIG. 14 which is a diagram of the example point to multipoint network after re-establishment of the path and the elimination of the overlapping branches. Initially, the root user #1 generates an ADD PARTY message (referenced 270) with end point refernce (EPR) equal to 7 and sends it to the root node A. Node A calculates a route for user #6 (dotted line 264 in FIG. 12) and sends the ADD PARTY message with the corresponding DTL stack to node with EPR equal to 15 (referenced 272).

The EPR list for node after it configures its switching tables for the call is presented in Table 10 below.

TABLE 10

| Link 221 | Link 223 | Link 225 |
|---|---|---|
| 0 | | 12 |
| 2 | 5 | |
| 3 | 7 | |

TABLE 10-continued

| Link 221 | Link 223 | Link 225 |
|---|---|---|
| 6 | 9 | |
| 7 | | 15 |

Node B converts the ADD PARTY message to a SETUP message with EPR equal to 6 and sends it to node D (reference 274). A SETUP message is sent because the link between nodes B and D is not a branch of an already existing point to multipoint call. Node D realizes it is an overlapping node (via the NCCI indicator, for example) and in accordance with the method forwards the SETUP message with EPR equal to 14 to node E (referenced 276). Node E also realizes it is an overlapping node, marks it in its local database and forwards the SETUP message with EPR equal to 10 to node F (referenced 278). Node F forwards the SETUP message with EPR equal to 3 to user #6 (referenced 280).

The user #6 replies with a CONNECT message with EPR equal to 3 to node F (referenced 282). Node F forwards the CONNECT message with EPR equal to 10 to node E (referenced 284). When node E receives the CONNECT message it uses the call reference and end point reference numbers in the CONNECT message to search its database. In response to funding an 'overlapping node' indication in its database, node E generates a LEAF SETUP REQUST (LSR) message with a unique OVERLAP_LEAF_REF number and sends it a DTL stack [E] that includes only itself to node C (referenced 286). In addition, node E starts an overlap timer which if expires, causes node E to send a CONNECT message to node D permitting the overlapping branch. Node D, upon receipt of the CONNECT message may itself begin the process to remove the overlapping branch. This may occur in the event that the ADD PARTY message from the ROOT node is never received by node E.

Node C receives the LSR message and adds itself to the DTL stack to yield [C, E]. Node C forwards the LSR message to the root node A (referenced 288). Node A adds itself to the DTL stack to yield [A, C, E] and stores the OVERLAP_LEAF_REF number in its database. Node A then sends an ADD PARTY message to node C with EPR equal to 21, the OVERLAP_LEAF_REF number and the DTL stack [A, C, E] (referenced 290). The OVERLAP_LEAF_REF number will be used by node E to associate the ADD PARTY message it receives with the LSR message it sent previously.

Node C forwards the ADD PARTY message to node E with EPR equal to 22, OVERLAP_LEAF_REF number and the DTL stack (referenced 292). Node E stops its overlap timer upon receipt of the ADD PARTY message and finds a match on the OVERLAP_LEAF_REF number in its database. It then generates an ADD PARTY CONNECT message and sends it to node C with EPR equal to 22 (referenced 294). The ADD PARTY CONNECT message is forwarded by node C to node A (referenced 296). Node A starts its own overlap timer which if expires, causes the newly created path between nodes A, C and E to be released.

Node E also generates a RELEASE message and sends it to node D with EPR equal to 14, a cause information element (IE) indicating overlap and the OVERLAP_LEAF_REF number (referenced 298). This causes the segment between nodes D and E to be torn down. Node D foprwards the RELEASE message to node B with EPR equal to 6, a cause information element (IE) inducating overlap and the OVERLAP_LEAF_REF number (referenced 300). This causes the segment 310 between nodes B and D to be torn down. Node B converts the RELEASE message to an ADD PARTY REJECT message and sends it to root node A with EPR number equal 15 (refenced 302). Node A checks its database for a match with the OVERLAP_LEAF_REF number received in the reject message. When it finds it, it tears down the segment 312 between nodes A and B. Node A stops its overlap timer and reconfigures its switching database to associate EPR 7 with EPR 21. Node A finally sends an ADD PARTY CONNECT message to the root user #1 (referenced 304).

The EPR list for node A after performing the method of the present invention is presented in Table 11 below.

TABLE 11

| Link 221 | Link 223 | Link 225 |
|---|---|---|
| 0 |  | 12 |
| 2 | 5 |  |
| 3 | 7 |  |
| 6 | 9 |  |
| 7 | 21 |  |

Thus, the method of the present functions to detect and remove overlapping branches in point to multipoint calls in a simple and effective manner. The method uses an existing brance of the call to back construct the appropriate DTL stack and forward it downstream to create a non-overlapping path.

While the invention has been described with respect to a limited number of embodiments, it will be appreciated that many variations, modifications and other applications of the invention may be made.

What is claimed is:

1. In an Asynchronous Transfer Mode (ATM) network having a plurality of nodes, a method of removing overlapping branches created when a leaf node is added to an already established point to multipoint call whereby a root node calculates a route for the new leaf node utilizing a corrupted point to multipoint view which results in the establishment of one or more overlapping nodes, a node being an overlapping node when it receives ingress streams from two different nodes for the same point to multipoint call, thus creating an overlapping branch between said overlapping node and the adjacent ingress node along the route calculated for said new leaf node, said method comprising the steps of:

recognizing that the route calculated by said root node for adding a new leaf node to said point to multipoint call creates one or more overlapping nodes on one or more overlapping branches;

establishing a downstream path from the overlapping node to the new leaf node to be added;

receiving a confirmation from the new leaf node by one of said one or more overlapping nodes that is closest to the new leaf node;

establishing an end point reference path from the overlapping node to the root node over previously established point to multipoint branches, thus creating a new path to the new leaf node that does not create any overlapping nodes; and removing all overlapping branches from the point to multipoint call.

2. The method in accordance with claim 1, wherein the step of recognizing utilizes a Network Call Correlation Identifier (NCCI) generated by the root node.

3. The method in accordance with claim 1, wherein the step of recognizing utilizes a global unique identifier in determining that a node is an overlapping node.

4. The method in accordance with claim 1, wherein the step of recognizing comprises the steps of:

receiving a call setup message for a point to multipoint call;

comparing a Network Call Correlation Identifier (NCCI) in the setup message with NCCIs previously received; and declaring an overlapping node condition if a match is found.

5. The method in accordance with claim 1, wherein the step of establishing a downstream path comprises the step of sending an add party message to a next node along said calculated route if the next node is part of an existing point to multipoint call.

6. The method in accordance with claim 1, wherein the step of establishing a downstream path comprises the step of sending a setup message to a next node along said calculated route if the next node is not part of an existing point to multipoint call.

7. The method in accordance with claim 1, wherein the step of receiving comprises the step of receiving a CONNECT message returned by the leaf node.

8. The method in accordance with claim 1, wherein the step of establishing an end point reference path comprises the steps of:

receiving a call confirmation message;

generating a unique overlap leaf reference number;

sending a leaf setup request message in an upstream direction on an input port associated with the already established point to multipoint branch, said leaf setup message including said overlap leaf reference number and a designated transmit list;

forwarding said leaf setup request message to said root node wherein each node along the path in the upstream direction including said root node adds itself to said designated transit list;

sending an add party message downstream to said overlapping node so as to create a new path to said new leaf node, said add party message including said overlap leaf reference number and said designated transit list;

receiving said add party message at said overlapping node and searching for a match of said overlap leaf reference number;

configuring said overlapping node for said new path of said point to multipoint call;

sending an add party connect message upstream to said root node; and configuring said root node to use said new path in response to receiving said add party connect message.

9. The method in accordance with claim 1, wherein the step of removing all overlapping branches comprises the steps of:

sending an add party reject message upstream on an overlapping branch if the overlapping node is part of an existing point to multipoint call;

sending a release message upstream on the overlapping branch if the overlapping node is not part of an existing point to multipoint call;

releasing any existing overlapping branches on the call path from said overlapping node to said root node;

configuring said root node to utilize said new path rather than the path that includes one or more overlapping branches; and sending an add party connect message to a root user connected to said root node.

* * * * *